(12) United States Patent
Nishimura et al.

(10) Patent No.: US 10,020,080 B2
(45) Date of Patent: Jul. 10, 2018

(54) NUCLEAR REACTOR NOZZLE REPAIR METHOD

(71) Applicant: MITSUBISHI HEAVY INDUSTRIES, LTD., Tokyo (JP)

(72) Inventors: Tsuyoshi Nishimura, Tokyo (JP); Takeshi Yamamoto, Tokyo (JP); Hideshi Sakashita, Tokyo (JP); Kensuke Tsuboi, Tokyo (JP); Tomonobu Sato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 396 days.

(21) Appl. No.: 14/655,110

(22) PCT Filed: Dec. 24, 2013

(86) PCT No.: PCT/JP2013/084521
§ 371 (c)(1),
(2) Date: Jun. 24, 2015

(87) PCT Pub. No.: WO2014/104030
PCT Pub. Date: Jul. 3, 2014

(65) Prior Publication Data
US 2015/0325319 A1 Nov. 12, 2015

(30) Foreign Application Priority Data
Dec. 28, 2012 (JP) .................... 2012-289030

(51) Int. Cl.
*G21C 13/036* (2006.01)
*G21C 17/017* (2006.01)
(Continued)

(52) U.S. Cl.
CPC ......... *G21C 13/036* (2013.01); *G21C 17/017* (2013.01); *G21C 19/02* (2013.01);
(Continued)

(58) Field of Classification Search
CPC .. G21C 13/032; G21C 13/036; G21C 13/067; G21C 13/0675
See application file for complete search history.

(56) References Cited

U.S. PATENT DOCUMENTS 4,440,339 A * 4/1984 Tamai ............... G21C 7/10
138/97
5,196,160 A 3/1993 Porowski
(Continued)

FOREIGN PATENT DOCUMENTS

BE 664890 A 10/1965
JP 61-70491 A 4/1986
(Continued)

OTHER PUBLICATIONS

Decision of a Patent Grant dated Sep. 20, 2016, issued in counterpart Japanese Patent Application No. 2012-289030, with English translation. (4 pages).
(Continued)

*Primary Examiner* — Sharon M Davis
(74) *Attorney, Agent, or Firm* — Westerman, Hattori, Daniels & Adrian, LLP

(57) ABSTRACT

A nozzle repair method and a nuclear reactor vessel include: removing a trepanning portion (208) as a connection portion with respect to an in-core instrumentation cylinder (204) in a groove-welding portion (206); removing the in-core instrumentation cylinder (204) from a semi-spherical portion (66) as a lower end plate; forming a surface buttered-welding portion (210) by buttered-welding the surface of the groove-welding portion (206); forming a welding groove (212) by grooving the surface buttered-welding portion (210); inserting a new in-core instrumentation cylinder (204A) provided with a circumferential groove portion (204*f*) outside an instrumentation equipment guide passage (204*d*) into an attachment hole (203); and fixing the new in-core instru-
(Continued)

mentation cylinder (204A) by groove-welding the welding groove (212). Accordingly, since the nozzle welding area is suppressed to a predetermined range, the workability of the repair is improved.

6 Claims, 26 Drawing Sheets

(51) Int. Cl.
    *G21C 19/20*     (2006.01)
    *G21C 19/02*     (2006.01)
    G21C 17/003     (2006.01)

(52) U.S. Cl.
    CPC ......... *G21C 19/207* (2013.01); *G21C 17/003* (2013.01); *Y02E 30/40* (2013.01)

(56) References Cited

U.S. PATENT DOCUMENTS

| | | | | |
|---|---|---|---|---|
| 5,267,279 A | * | 11/1993 | Saito | F16L 55/18 138/97 |
| 5,605,361 A | * | 2/1997 | Sims | F16L 41/08 285/15 |
| 6,188,741 B1 | | 2/2001 | Ballas et al. | |
| 2005/0205527 A1 | * | 9/2005 | Remond | F16L 5/022 219/76.14 |
| 2011/0194663 A1 | * | 8/2011 | Hori | F16L 5/022 376/204 |

FOREIGN PATENT DOCUMENTS

| | | |
|---|---|---|
| JP | 2-102493 A | 4/1990 |
| JP | 2-105097 A | 4/1990 |
| JP | 2001-108784 A | 4/2001 |
| JP | 2002-139593 A | 5/2002 |
| JP | 2011-145271 A | 7/2011 |
| JP | 2012-32291 A | 2/2012 |

OTHER PUBLICATIONS

English Translation of Written Opinion dated Apr. 8, 2014, issued in corresponding Application No. PCT/JP2013/084521 (4 pages).
Extended (supplementary) European Search Report dated Jul. 6, 2016, issued in counterpart Application No. 13866884.3. (7 pages).
International Search Report dated Apr. 8, 2014, issued in corresponding application No. PCT/JP2013/084521 (2 pages).
Written Opinion of the International Searching Authority dated Apr. 8, 2014, issued in corresponding application no. PCT/JP2013/084521 (3 pages).

* cited by examiner

NUCLEAR REACTOR NOZZLE REPAIR METHOD

FIELD

The present invention relates to a nozzle repair method for repairing a nozzle provided in a nuclear reactor vessel and a nuclear reactor vessel provided with a nozzle.

BACKGROUND

For example, a nuclear power plant that includes a pressurized water reactor (PWR) uses light water as a nuclear reactor coolant and a neutron moderator while keeping the light water as high-temperature and high-pressure water which is not boiled throughout a reactor core, sends the high-temperature and high-pressure water to a vapor generator so as to generate a vapor by a heat exchange operation, and sends the vapor to a turbine generator so as to generate electric power.

In such a nuclear power plant, there is a need to periodically inspect various structures of the pressurized water reactor in order to ensure sufficient safety or reliability. Then, when a problem is found after various inspections, a necessary portion involved with the problem is repaired. For example, in the pressurized water reactor, a nuclear reactor vessel body is provided with a plurality of instrumentation nozzles penetrating a lower end plate. Further, each of the instrumentation nozzles is formed so that an in-core instrumentation guide pipe is fixed to the upper end thereof inside the reactor and a conduit tube is connected to the lower end thereof outside the reactor. Then, a neutron flux detector capable of measuring a neutron flux is insertable from the instrumentation nozzle to a reactor core (a fuel assembly) through the in-core instrumentation guide pipe by using the conduit tube.

The instrumentation nozzle is formed in a manner such that an in-core instrumentation cylinder formed of nickel base alloy is fitted into an attachment hole of a nuclear reactor vessel body formed of low-alloy steel and is welded by a material of nickel base alloy. For that reason, there is a possibility that a stress corrosion crack may occur in the in-core instrumentation cylinder due to the long-term use. Thus, when the stress corrosion crack occurs, there is a need to repair the instrumentation nozzle. A nozzle repair method of the related art is disclosed in, for example, Patent Literature 1 below. A method of repairing an elongated housing disclosed in Patent Literature 1 includes cutting an elongated housing such as a neutron flux monitor housing fixed to a lower end plate of a nuclear reactor vessel by welding at a welding portion in the vertical direction, removing the cut housing, removing a groove-welding portion for a nozzle of the nuclear reactor vessel along with the remaining housing, restoring a grooving portion to a head portion of the nozzle, fixing a housing inserted from a penetration hole of the nuclear reactor pressure vessel through a groove-welding portion for the nozzle, and fixing an inserted front end to the housing by welding.

CITATION LIST

Patent Literature

Patent Literature 1: Japanese Patent Application Laid-open No. 2-102493

SUMMARY

Technical Problem

In the above-described nozzle repair method of the related art, when the grooving portion is restored by removing the groove-welding portion for the nozzle of the nuclear reactor vessel along with the remaining housing, the inner surface of the penetration hole is machined, a new housing is inserted into the processed penetration hole, and the new housing is fixed by welding the groove-welding portion for the nozzle. For that reason, the inner diameter of the penetration hole into which the housing is inserted after the repair becomes larger than that of the penetration hole before the repair. Meanwhile, the inner diameter of the new housing is uniform, but the outer diameter needs to be large so as to match the inner diameter of the penetration hole after the repair. In a technical standard for nuclear power generation equipment, the depth or the width of the welding joint with respect to the plate thickness of the pipe is set. Thus, when the plate thickness of the housing increases, the depth or the width of the welding joint increases. The instrumentation nozzle of the nuclear reactor vessel body is formed so that the circumferential inner surface is provided with a buttered-welding layer formed of stainless steel. Since the buttered-welding layer does not form the reinforced member of the nuclear reactor vessel body, the welding joint needs to be located within a range not reaching the buttered-welding layer. However, when the depth or the width of the welding joint increases, there is a possibility that the welding portion reaches the buttered-welding layer. Accordingly, there is a concern that the repair is difficult.

The invention is made to solve the above-described problems, and an object of the invention is to provide a nozzle repair method and a nuclear reactor vessel that improve the workability of a repair by suppressing a nozzle welding area to a predetermined range.

Solution to Problem

According to an aspect of the present invention, a nozzle repair method for a nozzle in which an in-core instrumentation cylinder is inserted into an attachment hole formed in a semi-spherical portion of a nuclear reactor vessel and the inner surface side of the semi-spherical portion is groove-welded so as to fix the in-core instrumentation cylinder, comprises: removing a connection portion with respect to the in-core instrumentation cylinder in a groove-welding portion; removing the in-core instrumentation cylinder from the semi-spherical portion; forming a surface buttered-welding portion by buttered-welding the surface of the groove-welding portion; forming a welding groove by grooving the surface buttered-welding portion; inserting a new in-core instrumentation cylinder provided with a circumferential groove portion outside an instrumentation equipment guide passage into the attachment hole; and fixing the new in-core instrumentation cylinder by groove-welding the welding groove.

Accordingly, a welding groove is formed by buttered welding the surface of the groove-welding portion in which the in-core instrumentation cylinder is removed, a new in-core instrumentation cylinder provided with a circumferential groove portion outside the instrumentation equipment guide passage is inserted into the attachment hole, and the in-core instrumentation cylinder is fixed by groove-welding the welding groove. Since the new in-core instrumentation cylinder is provided with the circumferential groove portion, the thickness of the portion fixed to the attachment hole by groove-welding is thinned toward the outside of the groove portion. Accordingly, the depth or the width of each of the welding groove and the groove-welding portion for the welding groove may be suppressed within a predetermined range, and hence the workability of the repair may be improved.

Advantageously, in the nozzle repair method, when the surface buttered-welding portion is formed on the surface of the groove-welding portion, buttered-welding is performed on an area extending to the inner surface of the semi-spherical portion and buttered-welding is performed on an area extending to the attachment hole.

Accordingly, since the surface of the remaining existing groove-welding portion is coated by a new surface buttered-welding portion without any gap, the stress corrosion cracking resistance may be improved.

Advantageously, in the nozzle repair method, the surface buttered-welding portion is formed on the surface of the groove-welding portion and the inner surface of the attachment hole is machined.

Accordingly, since the inner surface of the attachment hole is machined and a new in-core instrumentation cylinder is inserted into the attachment hole, the attachment precision may be improved.

Advantageously, in the nozzle repair method, the welding groove is formed within an area of the groove-welding portion.

Accordingly, the in-core instrumentation cylinder may be appropriately fixed to the attachment hole, and hence the durability of the nozzle welding portion may be improved.

Advantageously, in the nozzle repair method, the new in-core instrumentation cylinder includes a main body portion which is inserted into the attachment hole, a support portion which is continuous to the upper end of the main body portion and has a diameter smaller than the main body portion, the instrumentation equipment guide passage which penetrates the main body portion and the support portion, and the groove portion of which the end is opened to a stepped portion between the main body portion and the support portion.

Accordingly, since the new in-core instrumentation cylinder is provided with the groove portion which is opened to the stepped portion between the main body portion and the support portion, the instrumentation nozzle may be simplified, and the depth or the width of each of the welding groove and the groove-welding portion for the welding groove in the in-core instrumentation cylinder may be suppressed within a predetermined range.

Advantageously, in the nozzle repair method, a welding material used to fix the new in-core instrumentation cylinder to the semi-spherical portion is a material having higher stress corrosion cracking resistance than the welding material of the groove-welding portion.

Accordingly, the stress corrosion cracking resistance may be improved compared to the nozzle of the related art.

According to another aspect of the present invention, a nuclear reactor vessel comprises: a nuclear reactor vessel body of which a lower portion is formed in a semi-spherical shape; a nuclear reactor vessel head which is formed in a semi-spherical shape and is attached to an upper portion of the nuclear reactor vessel body; an inlet nozzle and an outlet nozzle which are provided at the side portion of the nuclear reactor vessel body; a reactor core which is disposed inside the nuclear reactor vessel body and is formed by a plurality of fuel assemblies; a plurality of control rods which is insertable into the fuel assemblies; a control rod driving mechanism which moves the control rods in the vertical direction; and a plurality of instrumentation nozzles which is provided at the lower portion of the nuclear reactor vessel body and into which a neutron flux detector is insertable. Any one of the plurality of instrumentation nozzles includes a main body portion which is fixed to the lower portion of the nuclear reactor vessel body, a support portion which is continuous to the upper end of the main body portion and has a diameter smaller than the main body portion, an instrumentation equipment guide passage which penetrates the main body portion and the support portion, and a groove portion of which the end is opened to a stepped portion between the main body portion and the support portion and which is formed in the circumferential direction.

Accordingly, since the new in-core instrumentation cylinder is provided with the circumferential groove portion, the thickness of the portion fixed to the attachment hole by groove-welding is thinned toward the outside of the groove portion. Accordingly, the depth or the width of each of the welding groove and the groove-welding portion for the welding groove may be suppressed within a predetermined range. As a result, the workability of the repair may be improved, and the structure of the repaired instrumentation nozzle may be simplified.

Advantageous Effects of Invention

According to the nozzle repair method and the nuclear reactor vessel of the invention, since the new in-core instrumentation cylinder is provided with the circumferential groove portion outside the instrumentation equipment guide passage, the thickness of the portion fixed to the attachment hole by groove-welding is thinned toward the outside of the groove portion. Accordingly, the depth or the width of each of the welding groove and the groove-welding portion for the welding groove may be suppressed within a predetermined range, and hence the workability of the repair may be improved.

BRIEF DESCRIPTION OF DRAWINGS

FIG. 5-1 is a schematic diagram of the nuclear reactor vessel illustrating a water stopping operation for an in-core instrumentation cylinder in the instrumentation nozzle.

FIG. 5-2 is a schematic diagram illustrating the water stopping operation for the in-core instrumentation cylinder.

FIG. 11-1 is a schematic diagram illustrating a trepanning operation for the in-core instrumentation cylinder.

FIG. 11-2 is a cross-sectional view illustrating the trepanned in-core instrumentation cylinder.

FIG. 13-1 is a schematic diagram illustrating a thickness measurement operation for a stainless steel overlaid portion in the instrumentation nozzle.

FIG. 13-2 is a main enlarged diagram illustrating a thickness measurement operation for the stainless steel overlaid portion in the instrumentation nozzle.

FIG. 14-1 is a schematic diagram illustrating a welding portion area measurement operation in the instrumentation nozzle.

FIG. 14-2 is a main enlarged diagram illustrating the welding portion area measurement operation in the instrumentation nozzle.

FIG. 15-1 is a schematic diagram illustrating a buttered-welding operation in the instrumentation nozzle.

FIG. 15-2 is a cross-sectional view illustrating the instrumentation nozzle subjected to a buttered-welding operation.

FIG. 18-1 is a schematic diagram illustrating a grooving operation for the welding portion in the instrumentation nozzle.

FIG. 18-2 is a cross-sectional view illustrating a welding portion subjected to a grooving operation in the instrumentation nozzle.

FIG. 19-1 is a schematic diagram illustrating an operation of inserting an in-core instrumentation cylinder into the instrumentation nozzle.

FIG. 19-2 is a cross-sectional view illustrating the in-core instrumentation cylinder inserted into the instrumentation nozzle.

FIG. 20-1 is a schematic diagram illustrating a welding operation and an inspection operation for the in-core instrumentation cylinder in the instrumentation nozzle.

FIG. 20-2 is a cross-sectional view illustrating the in-core instrumentation cylinder welded to the instrumentation nozzle.

DESCRIPTION OF EMBODIMENTS

Hereinafter, a preferred embodiment of a nozzle repair method and a nuclear reactor vessel according to the invention will be described in detail with reference to the accompanying drawings. Furthermore, the invention is not limited to the embodiment.

Embodiment

Figure 2:
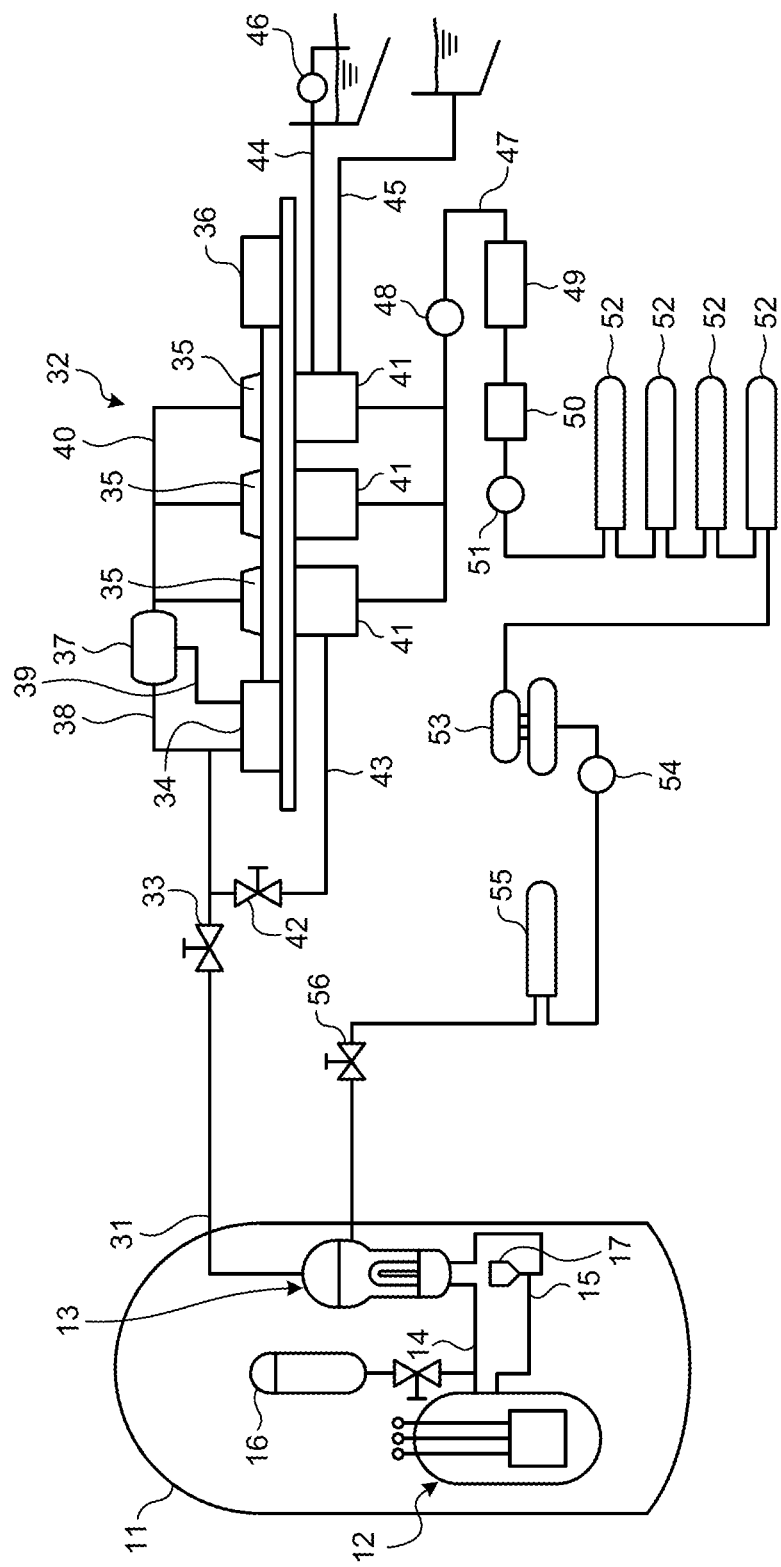
FIG. 2 is a schematic configuration diagram of a nuclear power plant.
Figure 3:
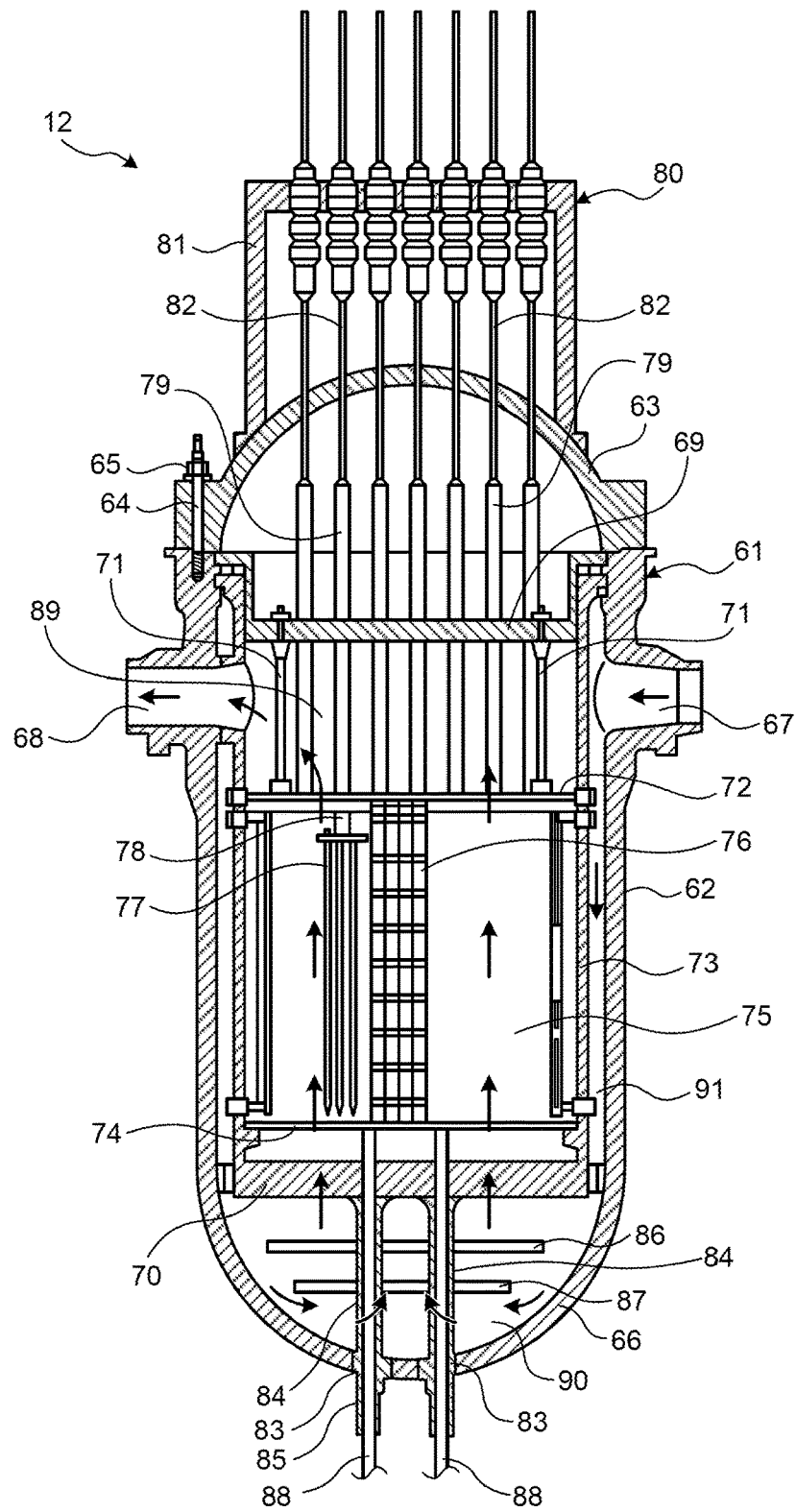
FIG. 3 is a longitudinal sectional view illustrating a pressurized water reactor.

FIG. 2 is a schematic configuration diagram of a nuclear power plant, and FIG. 3 is a longitudinal sectional view illustrating a pressurized water reactor.

A nuclear reactor of the embodiment is a pressurized water reactor (PWR) that uses light water as a nuclear reactor coolant and a neutron moderator while keeping the light water as high-temperature and high-pressure water which is not boiled throughout a reactor core, sends the high-temperature and high-pressure water to a vapor generator so as to generate a vapor by a heat exchange operation, and sends the vapor to a turbine generator so as to generate electric power.

In a nuclear power plant that includes the pressurized water reactor of the embodiment, as illustrated in FIG. 2, a containment 11 accommodates a pressurized water reactor 12 and a vapor generator 13 therein. Here, the pressurized water reactor 12 and the vapor generator 13 are connected to a high-temperature-side supply pipe 14 through a low-temperature-side supply pipe 15, the high-temperature-side supply pipe 14 is provided with a pressurizer 16, and the low-temperature-side supply pipe 15 is provided with a primary cooling water pump 17. In this case, light water is used as a moderator and primary cooling water (coolant), and a primary cooling system is controlled at a high-pressure state of about 150 to 160 atm by the pressurizer 16 in order to prevent the primary cooling water from being boiled in the reactor core portion.

Accordingly, in the pressurized water reactor 12, the light water as the primary cooling water is heated by low-enriched uranium or MOX as a fuel (an atomic fuel), and the high-temperature primary cooling water is sent to the vapor generator 13 through the high-temperature-side supply pipe 14 while being maintained at a predetermined high pressure by the pressurizer 16. In the vapor generator 13, the primary cooling water which is cooled by a heat exchange operation between the high-temperature and high-pressure primary cooling water and the secondary cooling water is returned to the pressurized water reactor 12 through the low-temperature-side supply pipe 15.

The vapor generator 13 is connected to a vapor turbine 32 through a pipe 31 that supplies the heated secondary cooling water, that is, vapor, and the pipe 31 is provided with a main vapor isolation valve 33. The vapor turbine 32 includes a high-pressure turbine 34 and a low-pressure turbine 35, and is connected to a generator (a generation device) 36. Further, a moisture separation heater 37 is provided between the high-pressure turbine 34 and the low-pressure turbine 35. Here, a cooling water branch pipe 38 which is branched from the pipe 31 is connected to the moisture separation heater 37, the high-pressure turbine 34 and the moisture separation heater 37 are connected to each other by a low-temperature reheating pipe 39, and the moisture separation heater 37 and the low-pressure turbine 35 are connected to each other by a high-temperature reheating pipe 40.

Further, the low-pressure turbine 35 of the vapor turbine 32 includes a condenser 41. Here, the condenser 41 is connected to a turbine bypass pipe 43 which extends from the pipe 31 and includes a bypass valve 42, and is connected to a water intake pipe 44 and a drainage pipe 45 which supply and discharge the cooling water (for example, sea water). The water intake pipe 44 includes a circulation water pump 46, and the other end thereof is disposed under the sea along with the drainage pipe 45.

Then, the condenser 41 is connected to a pipe 47, a condensate pump 48, a grand condenser 49, a condensed water desalting device 50, a condensate booster pump 51, and a low-pressure feed water heater 52. Further, the pipe 47 is connected to a deaerator 53, and is provided with a water feeding pump 54, a high-pressure feed water heater 55, and a water feeding control valve 56.

Accordingly, in the vapor generator 13, the vapor which is generated by the heat exchange operation with respect to the high-pressure and high-temperature primary cooling water is sent to the vapor turbine 32 (from the high-pressure turbine 34 to the low-pressure turbine 35) through the pipe 31. Then, the vapor turbine 32 is driven by the vapor so that the generator 36 generates electric power. At this time, the vapor which is sent from the vapor generator 13 is used to drive the high-pressure turbine 34, passes through the moisture separation heater 37 so that the vapor is heated while a moisture contained in the vapor is removed, and is used to drive the low-pressure turbine 35. Then, the vapor having been used to drive the vapor turbine 32 is cooled into condensed water by the sea water in the condenser 41, and is returned to the vapor generator 13 through the grand condenser 49, the condensed water desalting device 50, the low-pressure feed water heater 52, the deaerator 53, the high-pressure feed water heater 55, and the like.

In the pressurized water reactor 12 of the nuclear power plant with such a configuration, as illustrated in FIG. 3, a nuclear reactor vessel 61 includes a nuclear reactor vessel body 62 and a nuclear reactor vessel head (an upper end plate) 63 attached to the upper portion thereof so that an in-core structure is inserted thereinto, and the nuclear reactor vessel head 63 is fixed to the nuclear reactor vessel body 62 by a plurality of stud bolts 64 and a plurality of nuts 65 so as to be opened and closed.

The nuclear reactor vessel body 62 has a cylindrical shape of which the upper portion is opened by the separation of the nuclear reactor vessel head 63 and the lower portion is formed in a semi-spherical shape while being closed by a lower end plate 66. Then, the upper portion of the nuclear reactor vessel body 62 is provided with an inlet nozzle (an entrance nozzle) 67 which supplies the light water (coolant) as the primary cooling water and an outlet nozzle (an exist nozzle) 68 which discharges the light water. Further, the nuclear reactor vessel body 62 is provided with a water injection nozzle (a water injection nozzle) (not illustrated) separately from the inlet nozzle 67 and the outlet nozzle 68.

In the inside of the nuclear reactor vessel body 62, an upper core support 69 is fixed to a portion above the inlet nozzle 67 and the outlet nozzle 68 and a lower core support 70 is fixed so as to be located in the vicinity of the lower end plate 66. The upper core support 69 and the lower core support 70 are formed in a disk shape and are provided with a plurality of flow holes (not illustrated). Then, the upper core support 69 is connected to an upper core plate 72 provided with a plurality of flow holes (not illustrated) at a lower portion thereof through a plurality of reactor core support rods 71.

A core barrel 73 which has a cylindrical shape is disposed inside the nuclear reactor vessel body 62 with a predetermined gap with respect to the inner wall surface. Further, the upper portion of the core barrel 73 is connected to the upper core plate 72, and the lower portion thereof is connected to a lower core support plate 74 having a disk shape and a plurality of flow holes (not illustrated) formed therein. Then, the lower core support plate 74 is supported by the lower core support 70. That is, the core barrel 73 is suspended on the lower core support 70 of the nuclear reactor vessel body 62.

The reactor core 75 is formed by the upper core plate 72, the core barrel 73, and the lower core support plate 74, and the reactor core 75 has a plurality of fuel assemblies 76 disposed therein. Although not illustrated in the drawings, each of the fuel assemblies 76 is formed by binding a plurality of fuel rods in a grid shape by a support grid. Here, the upper nozzle is fixed to the upper end, and the lower nozzle is fixed to the lower end. Further, the reactor core 75 has a plurality of control rods 77 disposed therein. The plurality of control rods 77 is formed as a control rod cluster 78 while the upper ends are evenly arranged, and is insertable into the fuel assembly 76. In the upper core support 69, a plurality of control rod cluster guide pipes 79 is fixed while penetrating the upper core support 69, and each control rod cluster guide pipe 79 is formed so that the lower end thereof extends to the control rod cluster 78 inside the fuel assembly 76.

The upper portion of the nuclear reactor vessel head 63 that constitutes the nuclear reactor vessel 61 is formed in a semi-spherical shape, and a magnetic jack type control rod driving mechanism 80 is accommodated in a housing 81 which is integrated with the nuclear reactor vessel head 63. The plurality of control rod cluster guide pipes 79 is formed so that the upper ends thereof extend to the control rod driving mechanism 80, and control rod cluster driving shafts 82 which extend from the control rod driving mechanism 80 extend to the fuel assemblies 76 while passing through the inside of the control rod cluster guide pipes 79, thereby gripping the control rod cluster 78.

The control rod driving mechanism 80 extends in the vertical direction so as to be connected to the control rod cluster 78, and a control rod cluster driving shaft 82 of which the surface is provided with a plurality of circumferential grooves formed in the longitudinal direction is moved in the vertical direction by the magnetic jack, thereby controlling the output of the nuclear reactor.

Further, the nuclear reactor vessel body 62 is provided with a plurality of instrumentation nozzles 83 which penetrates the lower end plate 66, and each of the instrumentation nozzles 83 is formed so that the upper end inside the reactor is connected to the in-core instrumentation guide pipe 84 and the lower end outside the reactor is connected to a conduit tube 85. In each of the in-core instrumentation guide pipes 84, the upper end is connected to the lower core support 70 and upper and lower connection plates 86 and 87 for suppressing a vibration are connected to the in-core instrumentation guide pipes. A thimble pipe 88 is provided with a neutron flux detector (not illustrated) capable of measuring a neutron flux, and is insertable to the fuel assembly 76 while penetrating the lower core support plate 74 from the conduit tube 85 along the instrumentation nozzle 83 and the in-core instrumentation guide pipe 84.

Accordingly, the nuclear fission inside the reactor core 75 is controlled in a manner such that the control rod cluster driving shaft 82 is moved by the control rod driving mechanism 80 so as to extract the control rod 77 from the fuel assembly 76 by a predetermined amount. Then, the light water charged into the nuclear reactor vessel 61 is heated by the generated thermal energy, and the high-temperature light water is discharged from the outlet nozzle 68 so as to be sent to the vapor generator 13 as described above. That is, neutrons are discharged by the nuclear fission of the atomic fuel forming the fuel assembly 76, and the light water as the moderator and the primary cooling water decreases the movement energy of the discharged high-speed neutrons so as to form thermal neutrons. Accordingly, new nuclear fission may easily occur, and the generated heat is stolen and cooled. Meanwhile, when the control rod 77 is inserted into the fuel assembly 76, the number of neutrons generated inside the reactor core 75 may be adjusted. Further, when the entire control rod 77 is inserted into the fuel assembly 76, the nuclear reactor may be emergently stopped.

Further, the nuclear reactor vessel 61 is formed so that an upper plenum 89 communicating with the outlet nozzle 68 is provided above the reactor core 75 and a lower plenum 90 is provided therebelow. Then, a down corner portion 91 which communicates with the inlet nozzle 67 and the lower plenum 90 is formed between the nuclear reactor vessel 61 and the core barrel 73. Accordingly, the light water flows from the inlet nozzle 67 into the nuclear reactor vessel body 62, flows downward to the down corner portion 91, reaches the lower plenum 90, rises while being guided upward by the spherical inner surface of the lower plenum 90, passes through the lower core support 70 and the lower core support plate 74, and flows into the reactor core 75. The light water which flows into the reactor core 75 increases in temperature while cooling the fuel assembly 76 by absorbing the thermal energy generated from the fuel assembly 76 constituting the reactor core 75, passes through the upper core plate 72, rises to the upper plenum 89, and is discharged through the outlet nozzle 68.

In the nuclear reactor vessel 61 with such a configuration, the instrumentation nozzle 83 is formed in a manner such that the in-core instrumentation cylinder is fitted into an attachment hole formed in the lower end plate 66 of the nuclear reactor vessel body 62 and the upper end of the in-core instrumentation cylinder is fixed to the inner surface of the lower end plate 66 by groove-welding. The nuclear reactor vessel body 62 is formed by buttered-welding a stainless steel to the inner surface of low-alloy steel as a base material, and the in-core instrumentation cylinder of the nickel base alloy is welded to the nuclear reactor vessel body 62 by the material of the nickel base alloy while being fitted into the attachment hole of the nuclear reactor vessel body 62. For that reason, there is a possibility that a stress corrosion crack may occur in the in-core instrumentation cylinder due to the long-term use. Thus, when the stress corrosion crack occurs, there is a need to repair the instrumentation nozzle 83.

In a case where the instrumentation nozzle 83 is repaired, the groove-welding portion of the instrumentation nozzle 83 is trepanned so as to remove the in-core instrumentation cylinder, the inner surface of the attachment hole is machined, and a new in-core instrumentation cylinder is inserted into the processed attachment hole and is fixed by groove-welding. For that reason, the inner diameter of the repaired attachment hole becomes larger than that of the unrepaired attachment hole, and hence the outer diameter of the new in-core instrumentation cylinder is large although the inner diameter thereof is uniform. In a technical standard for nuclear power generation equipment, the depth or the width of the welding joint is set with respect to the plate thickness of the pipe. Thus, when the plate thickness of the in-core instrumentation cylinder increases, the depth or the width of the welding joint increases. Then, the welding joint extends to not the reinforced member of the nuclear reactor vessel body 62, but the buttered-welding layer. Accordingly, there is a concern that the repair is difficult.

Therefore, the nozzle repair method of the embodiment includes removing the connection portion with respect to the in-core instrumentation cylinder in the existing groove-welding portion, removing the in-core instrumentation cylinder from the lower end plate (the semi-spherical portion) 66, forming a surface buttered-welding portion on the surface of the groove-welding portion by buttered-welding, forming a welding groove by grooving the surface buttered-welding portion, inserting a new in-core instrumentation cylinder provided with a circumferential groove portion outside the instrumentation equipment guide passage into the attachment hole, and fixing the new in-core instrumentation cylinder by groove-welding the welding groove. In this case, since the new in-core instrumentation cylinder is provided with the groove portion in the circumferential direction, the thickness of the portion fixed to the attachment hole by groove-welding is thinned toward the outside of the groove portion. Accordingly, the depth or the width of each of the welding groove and the groove-welding portion for the welding groove may be suppressed within a predetermined range, and hence the workability of the repair may be improved.

Figure 1:
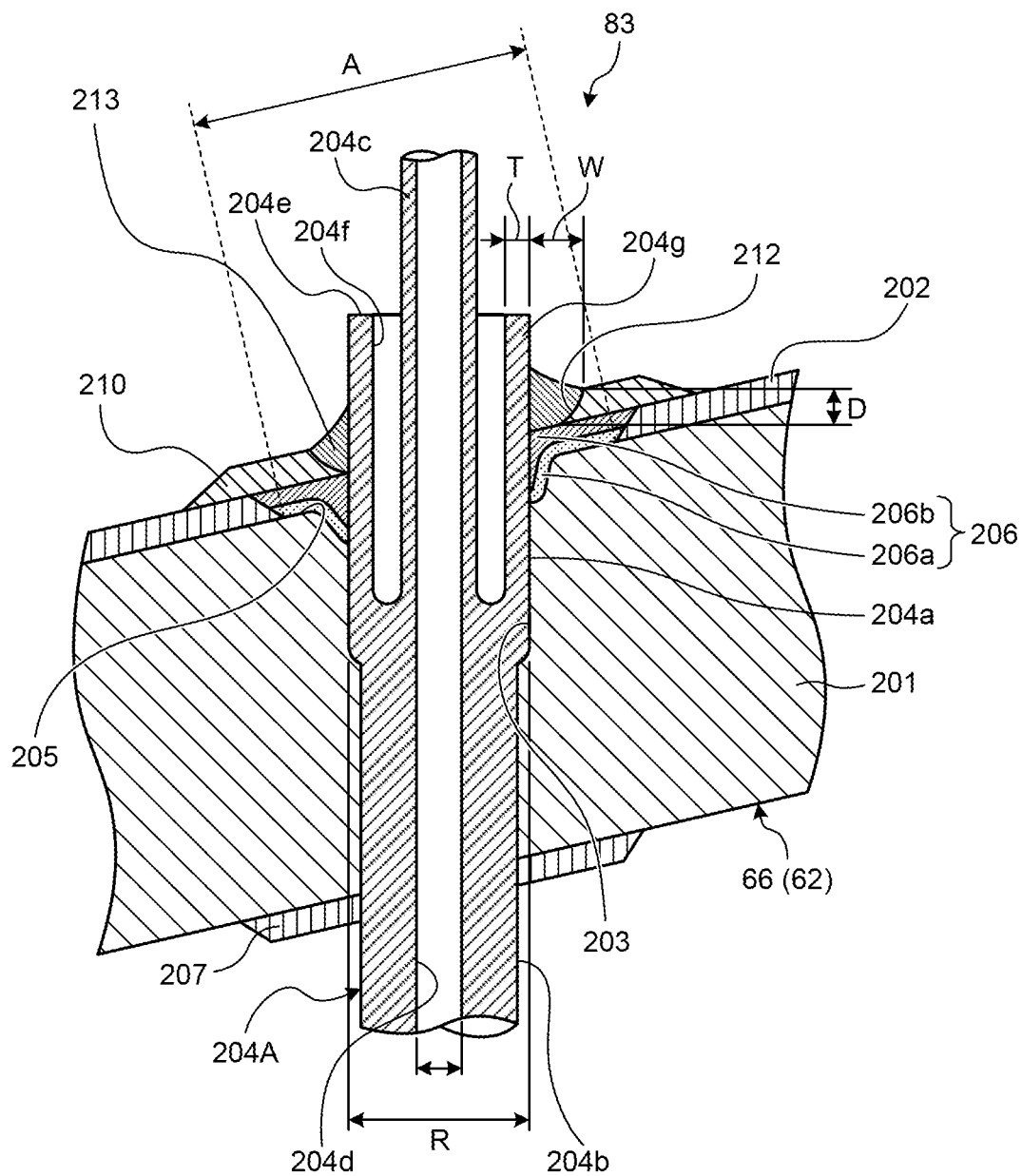
FIG. 1 is a cross-sectional view illustrating an instrumentation nozzle of a nuclear reactor vessel that is repaired by a nozzle repair method according to an embodiment of the invention.
Figure 4:
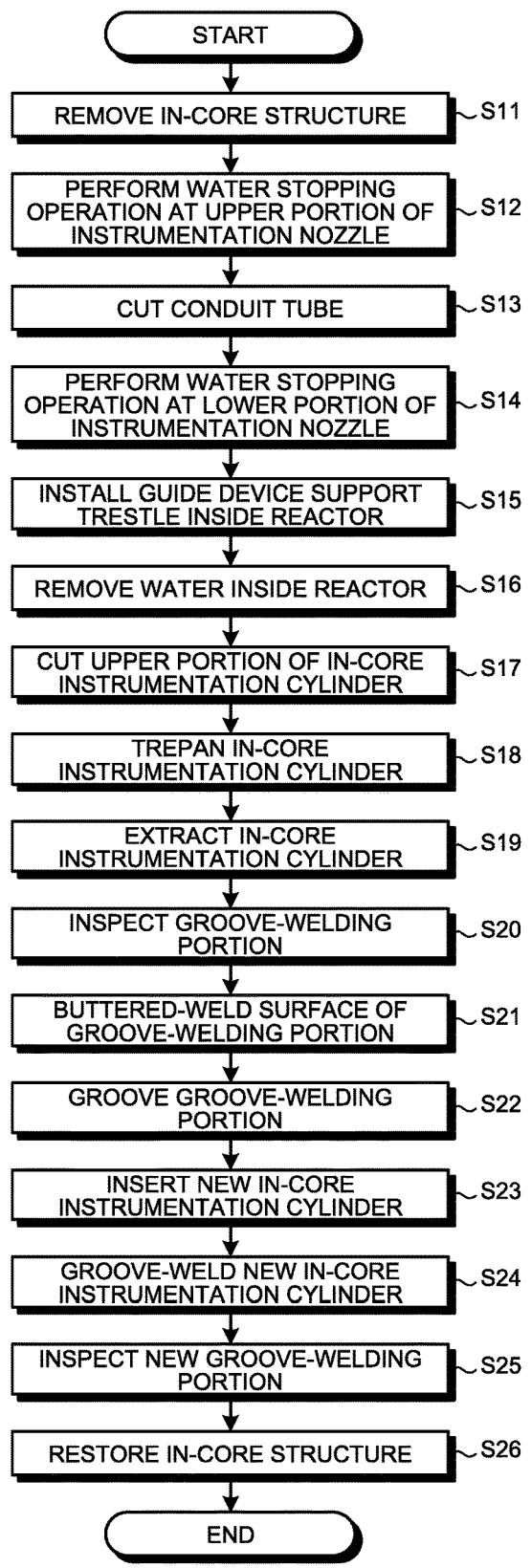
FIG. 4 is a flowchart illustrating the nozzle repair method of the embodiment.
Figures 1, 5:
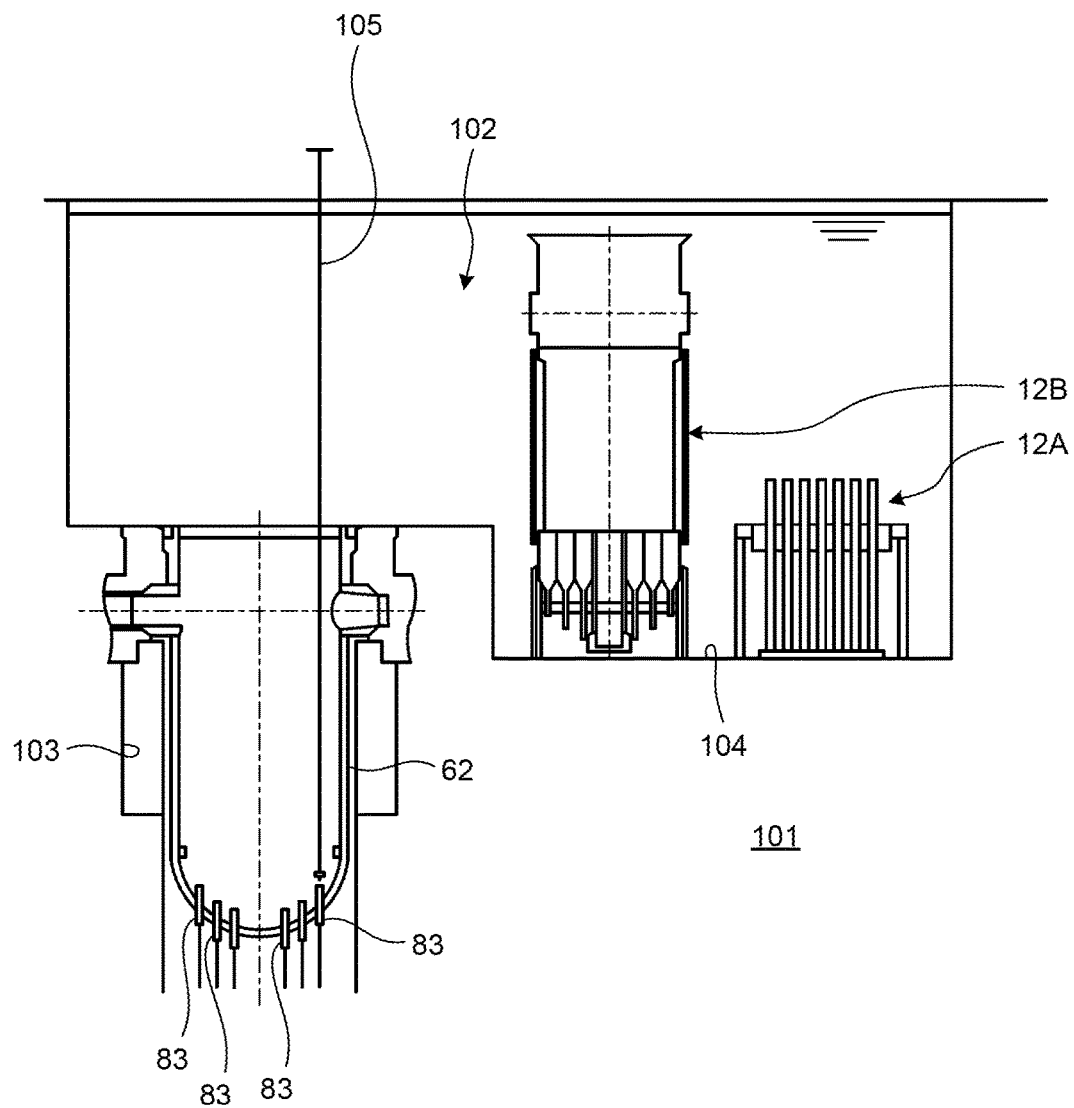
Figures 2, 5:
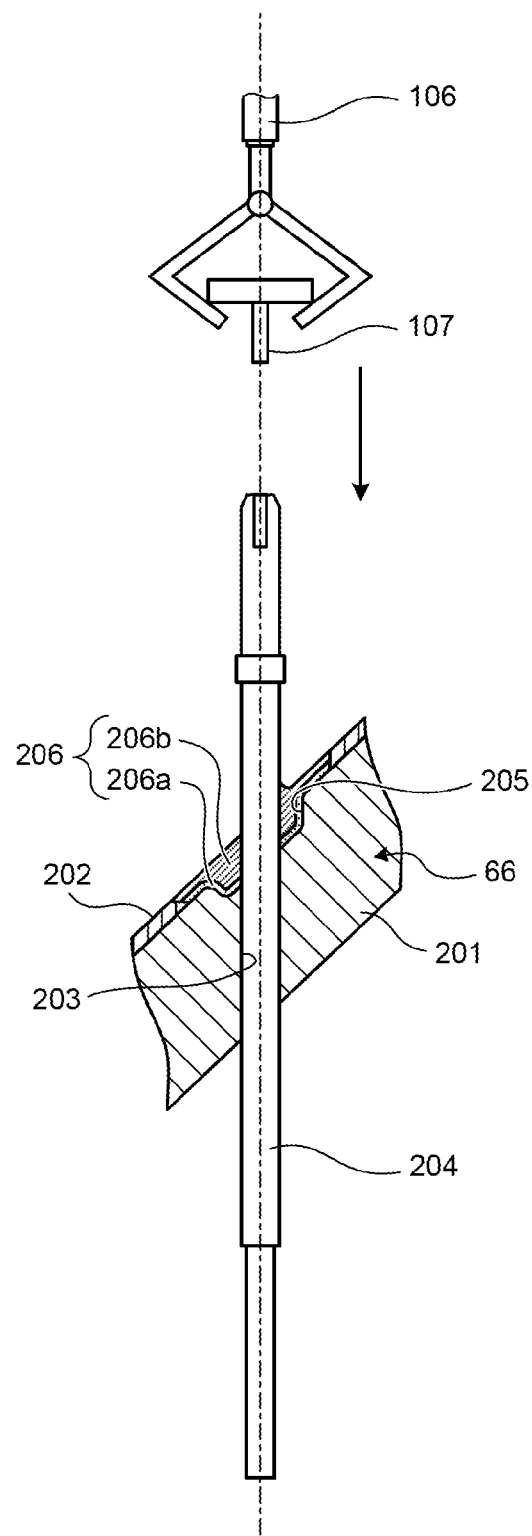
Figure 6:
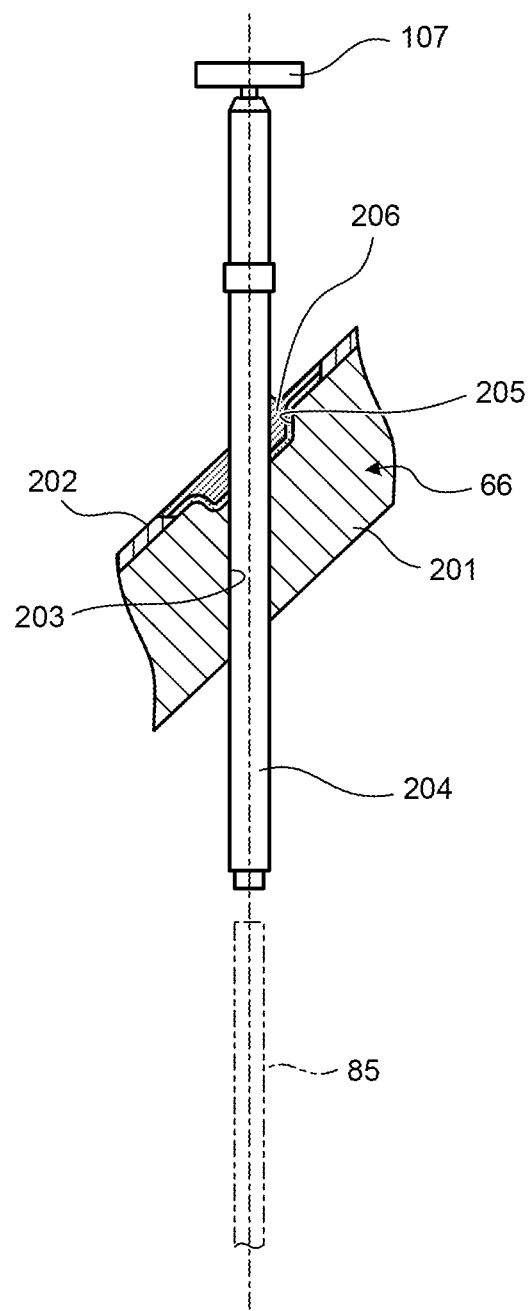
FIG. 6 is a schematic diagram illustrating a conduit tube cutting operation.
Figure 7:
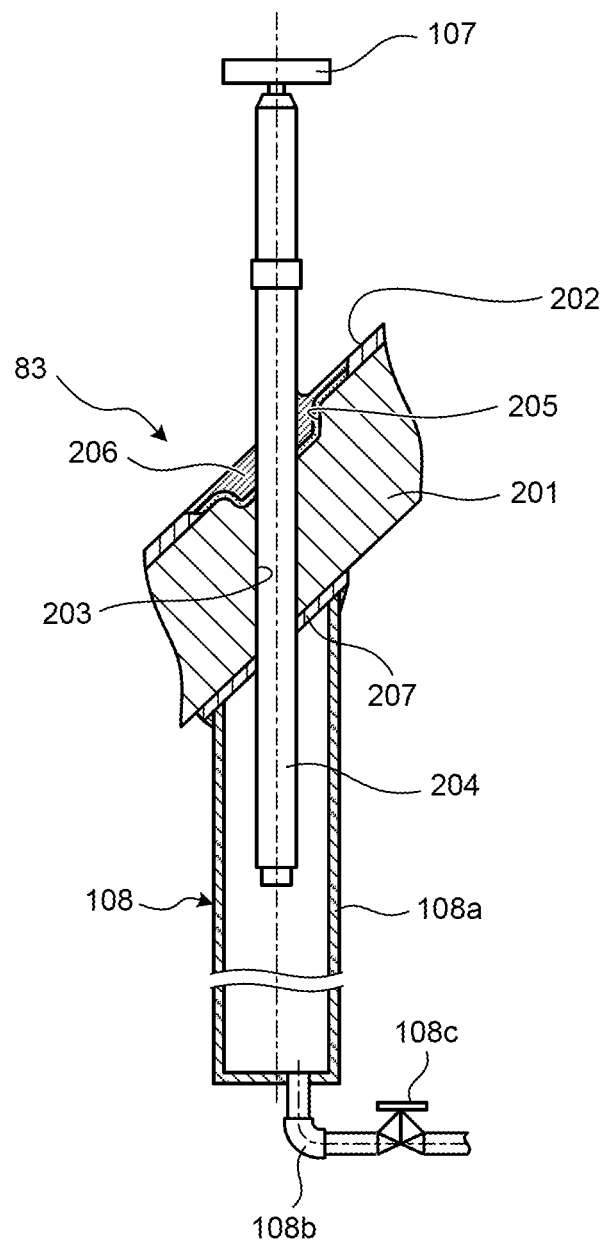
FIG. 7 is a schematic diagram illustrating a water stopping cap attachment operation.
Figure 8:
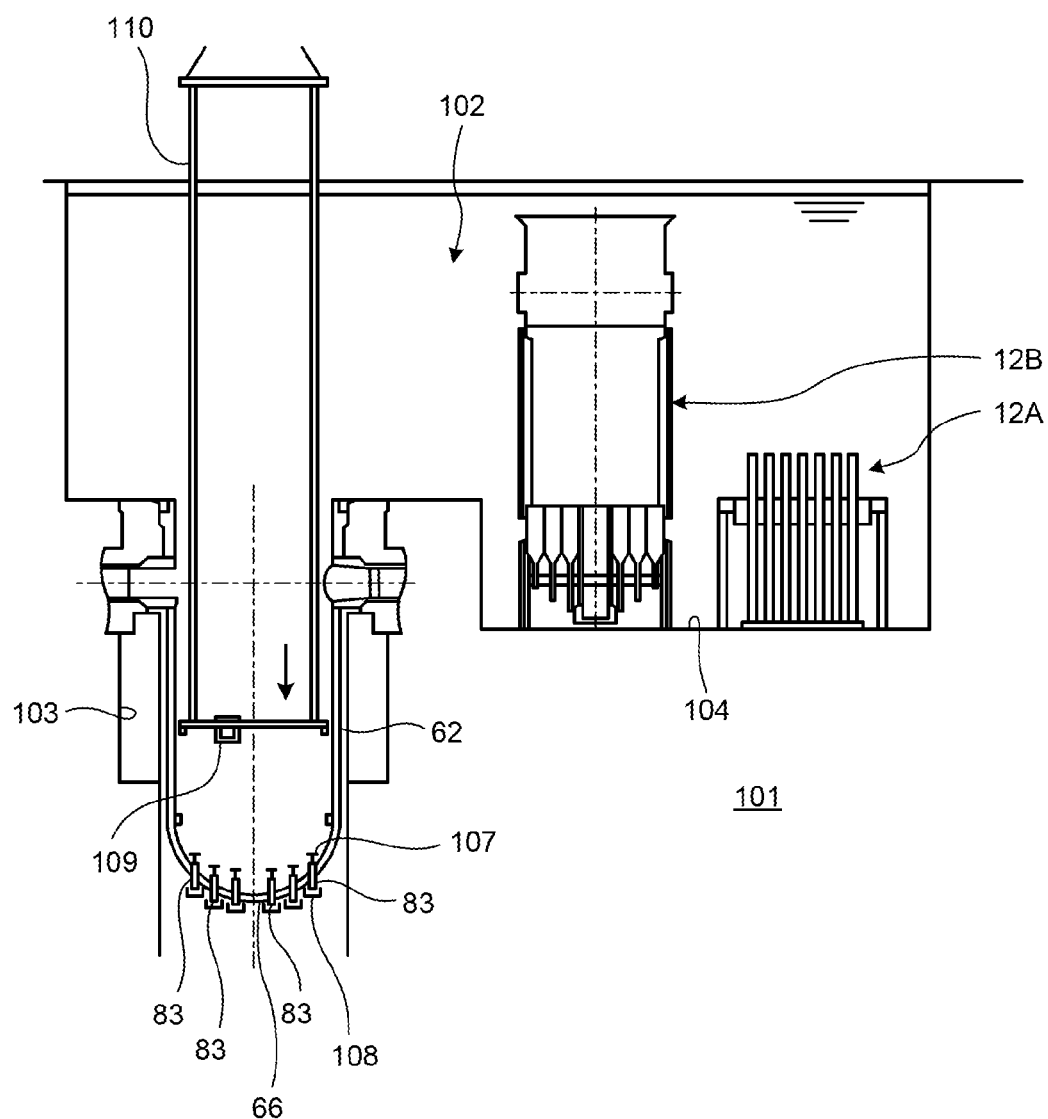
FIG. 8 is a schematic diagram illustrating an operation of mounting a guide device and a support trestle to the nuclear reactor vessel.
Figure 9:
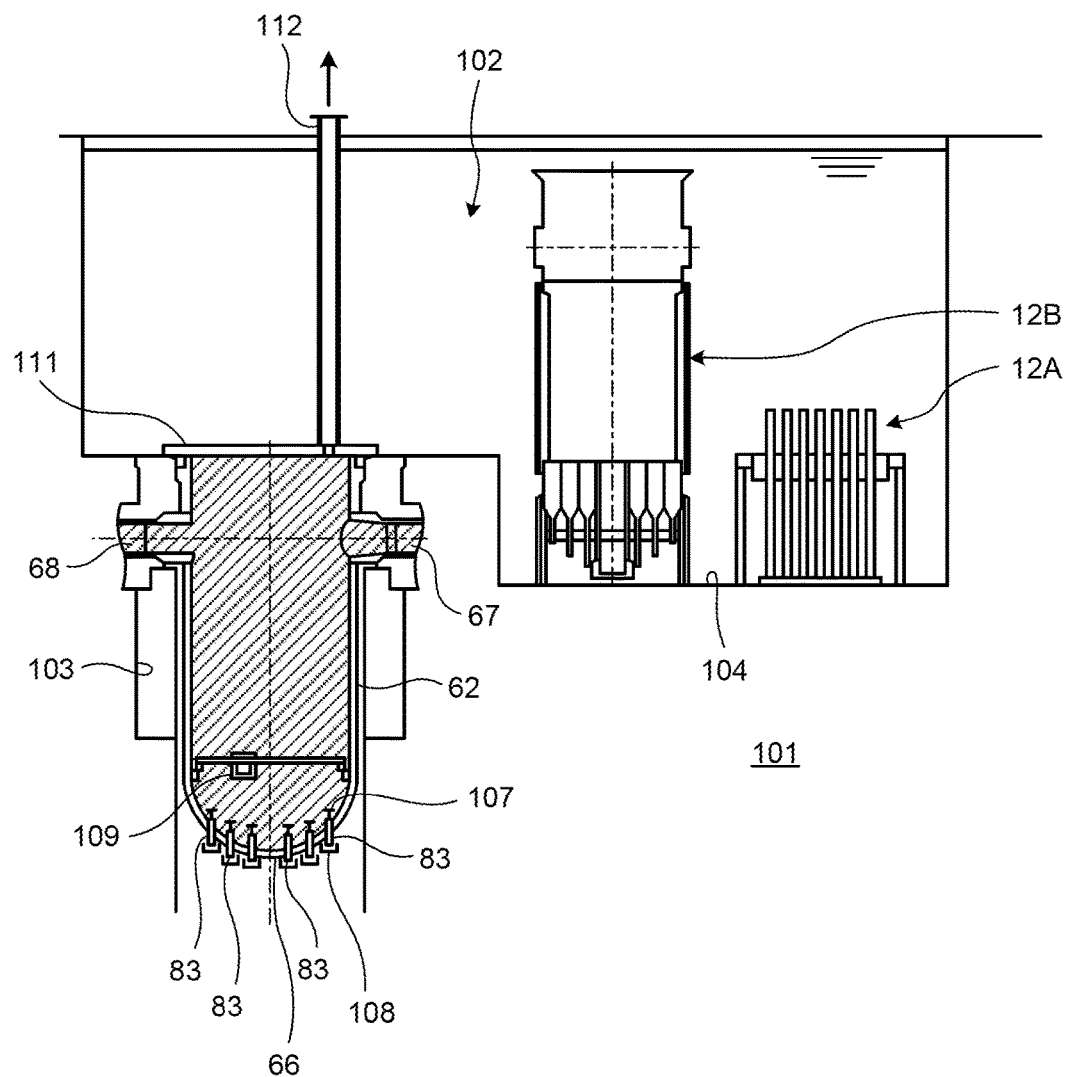
FIG. 9 is a schematic diagram illustrating a water removing operation in the nuclear reactor vessel.
Figure 10:
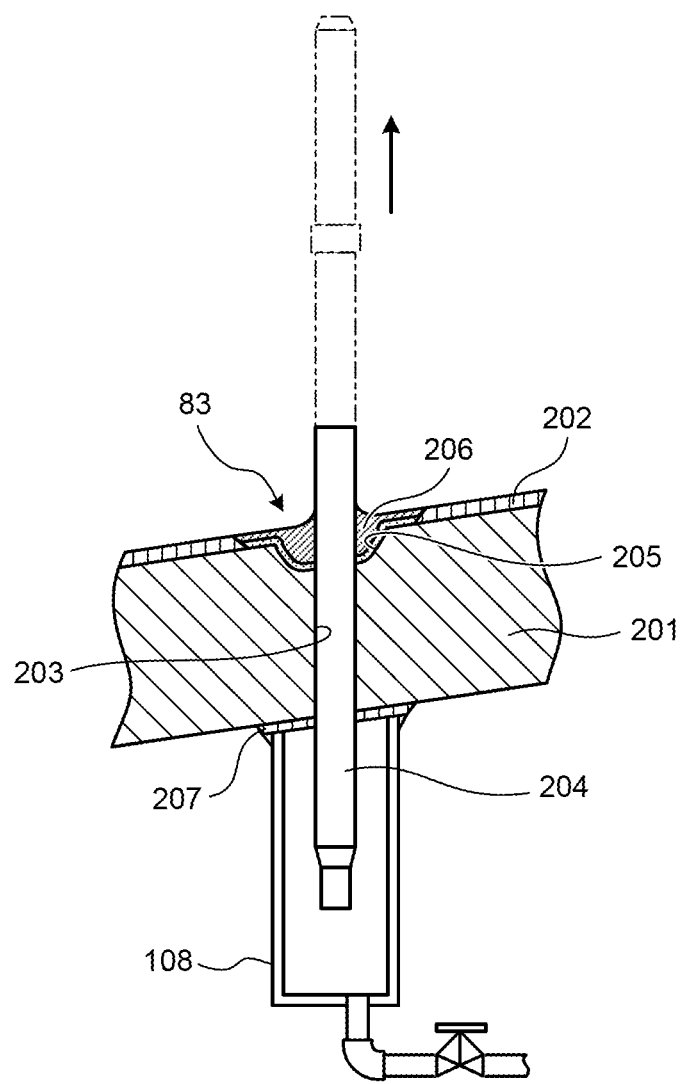
FIG. 10 is a schematic diagram illustrating a cutting operation for the in-core instrumentation cylinder.
Figures 1, 11:
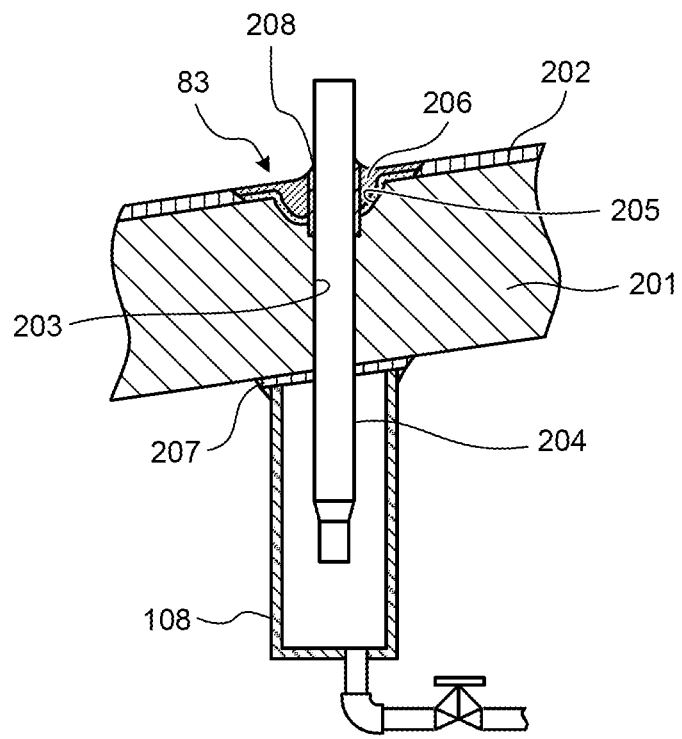
Figures 2, 11:
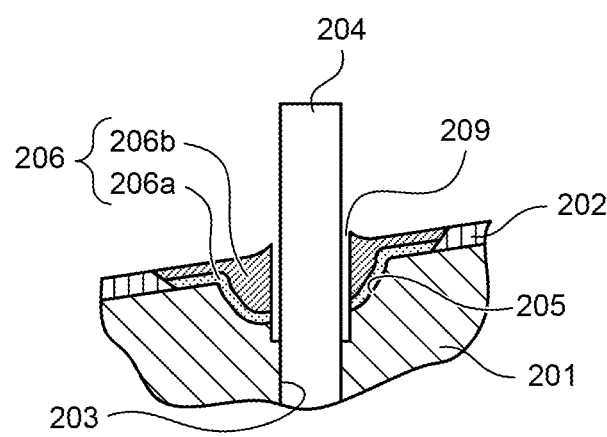
Figure 12:
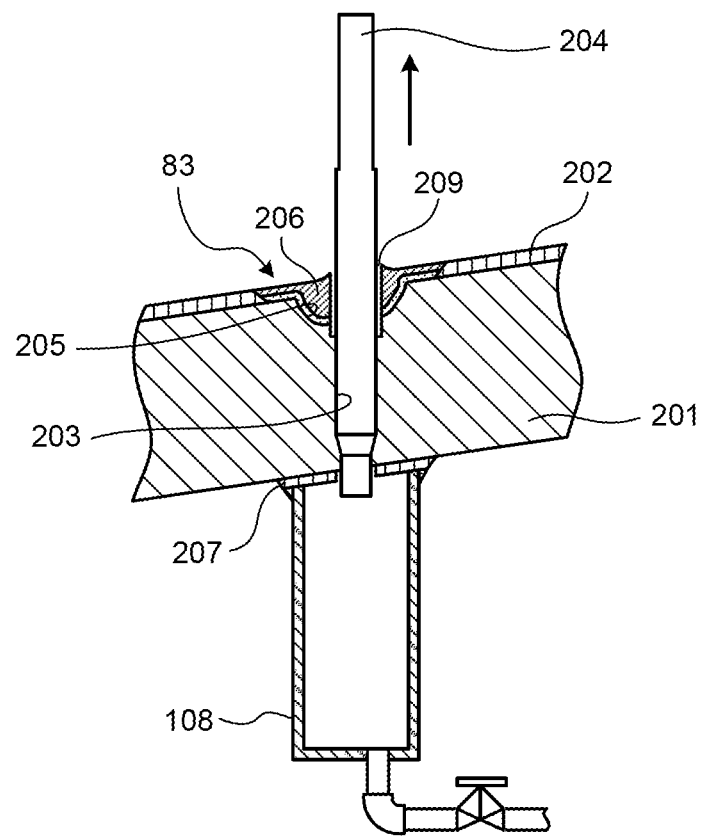
FIG. 12 is a cross-sectional view illustrating a drawing operation in the in-core instrumentation cylinder.
Figures 1, 13:
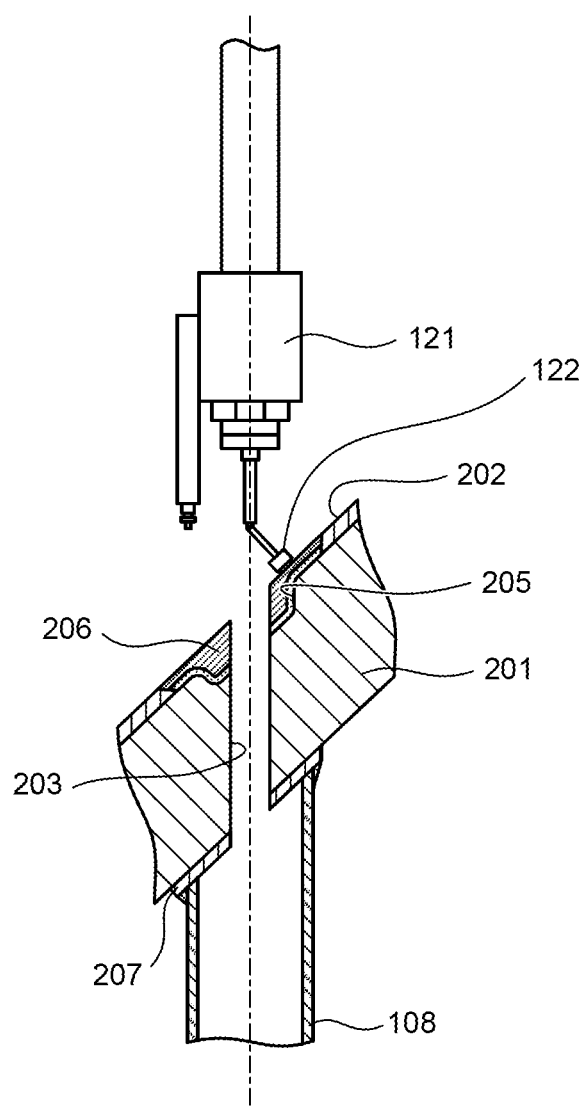
Figures 2, 13:
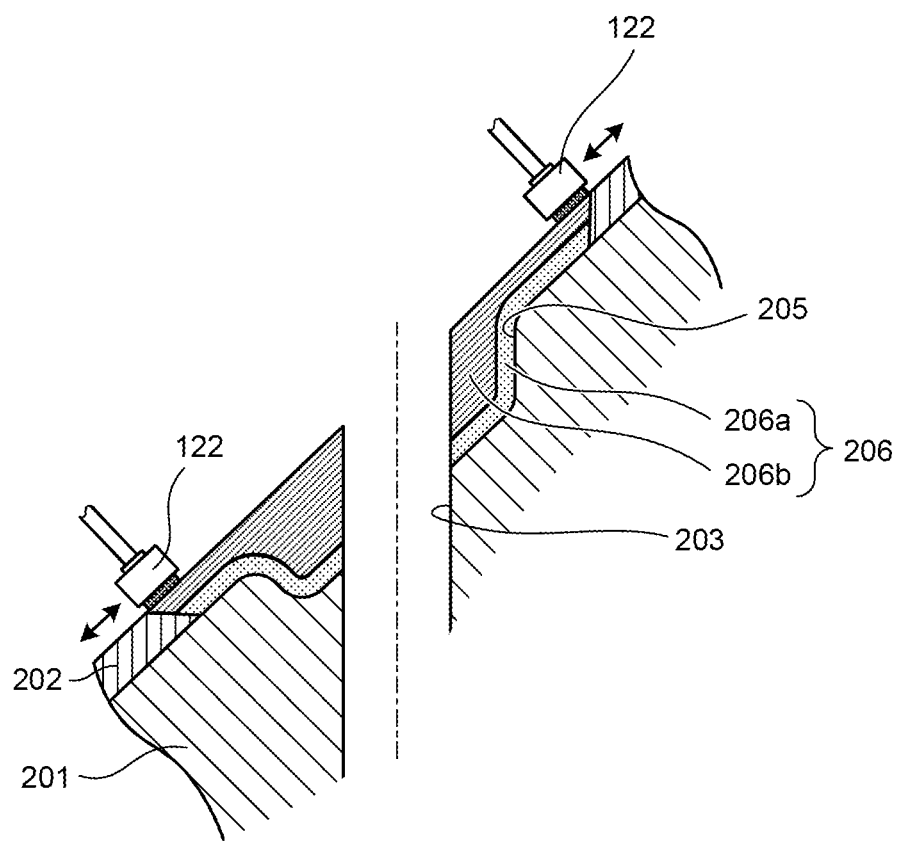
Figures 1, 14:
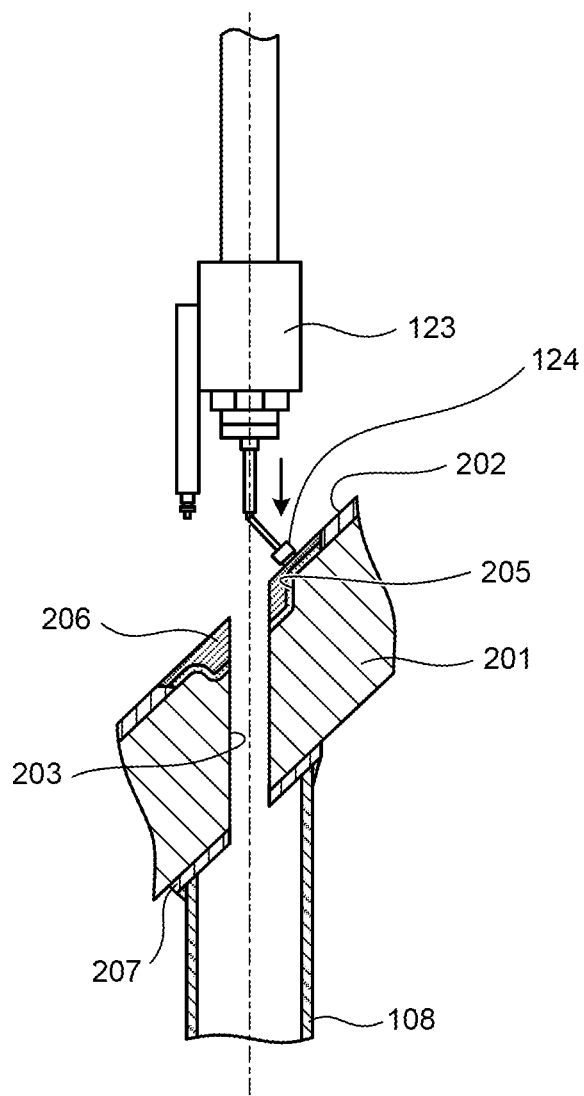
Figures 2, 14:
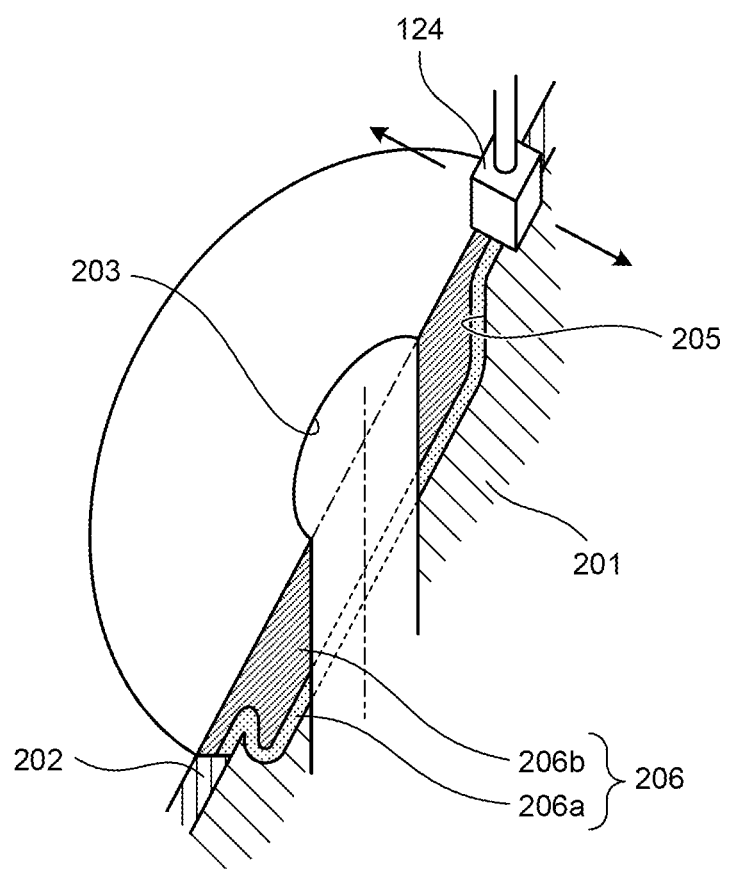
Figures 1, 15:
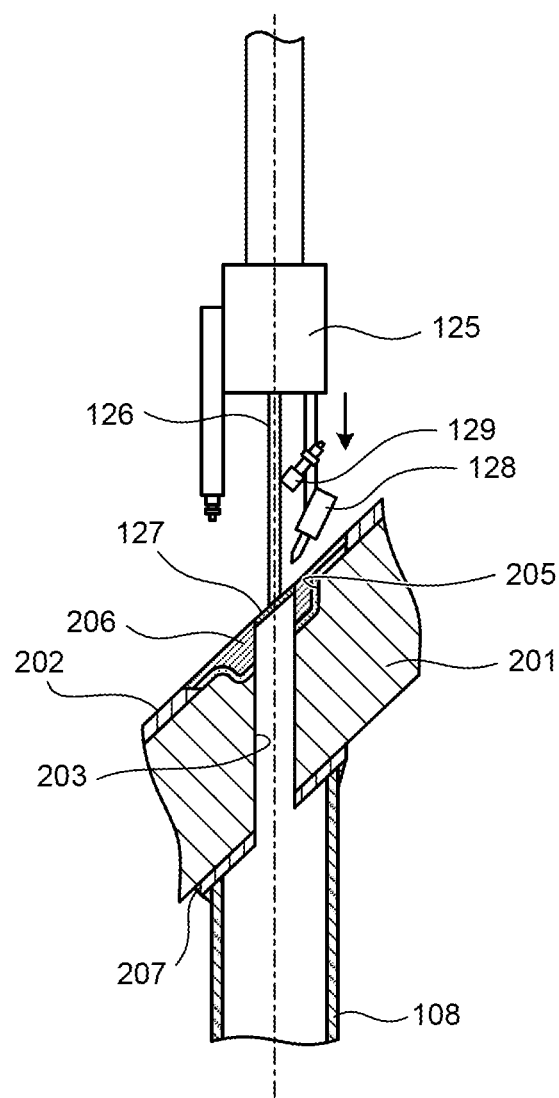
Figures 2, 15:
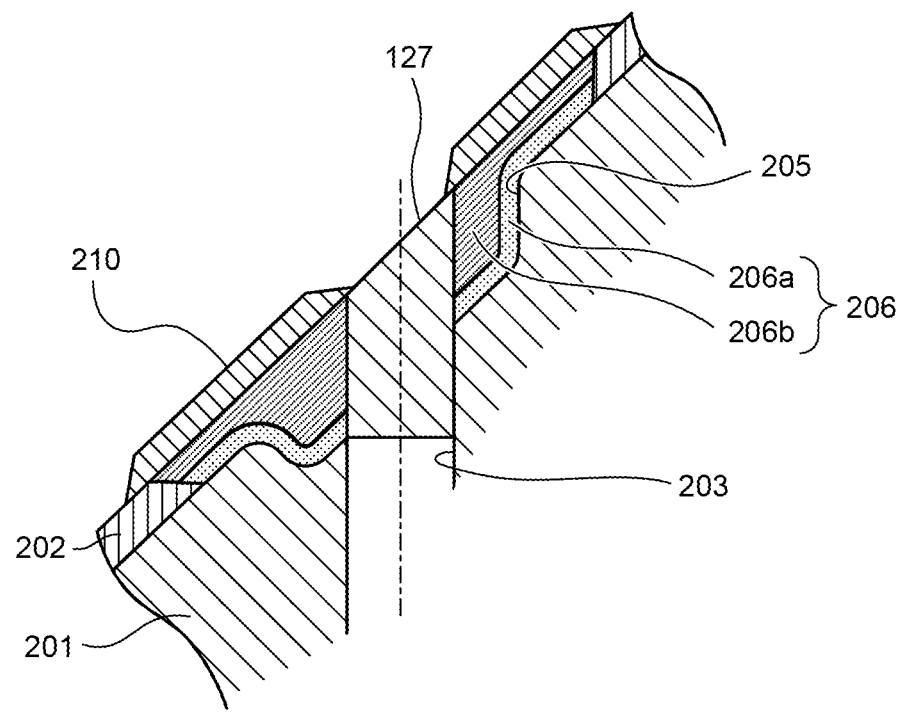
Figure 16:
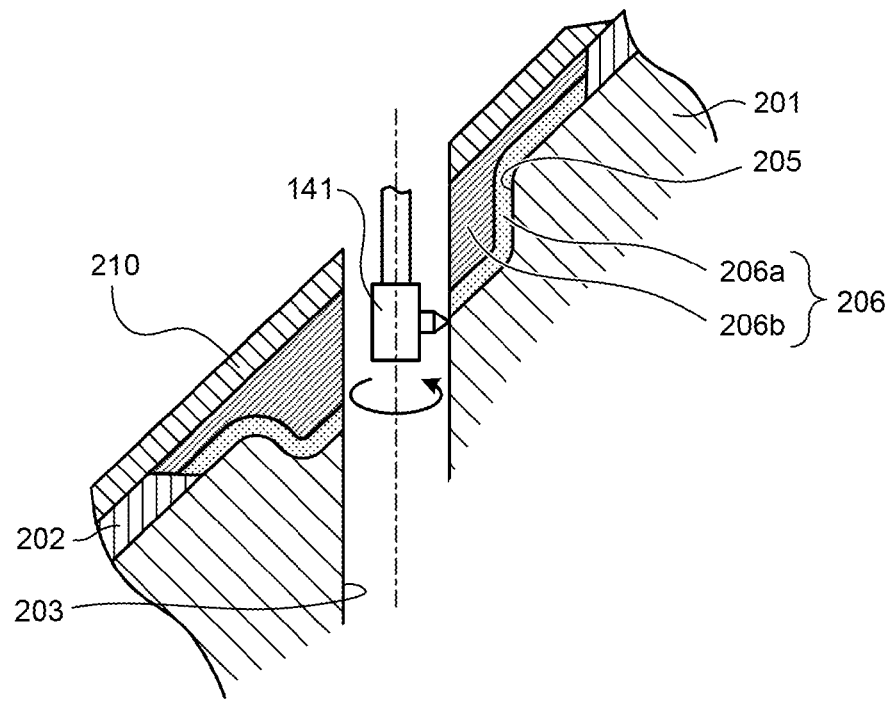
FIG. 16 is a cross-sectional view illustrating a buttered-welding portion subjected to a shaping operation in the instrumentation nozzle.
Figure 17:
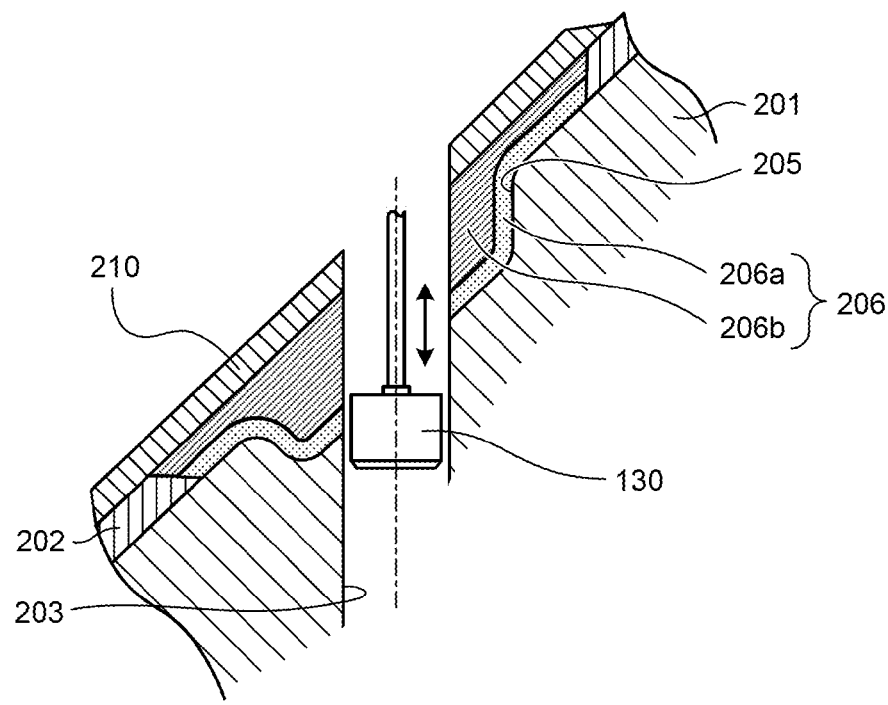
FIG. 17 is a schematic diagram illustrating a measurement operation for a welding portion in the instrumentation nozzle.
Figures 1, 18:
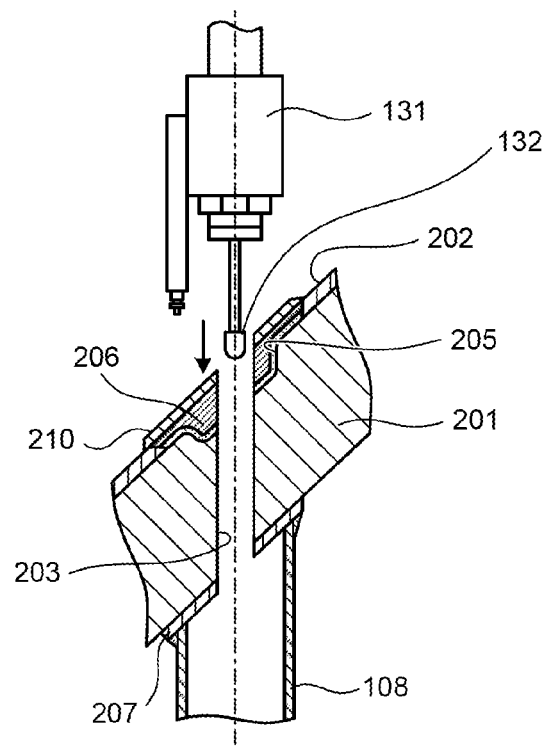
Figures 2, 18:
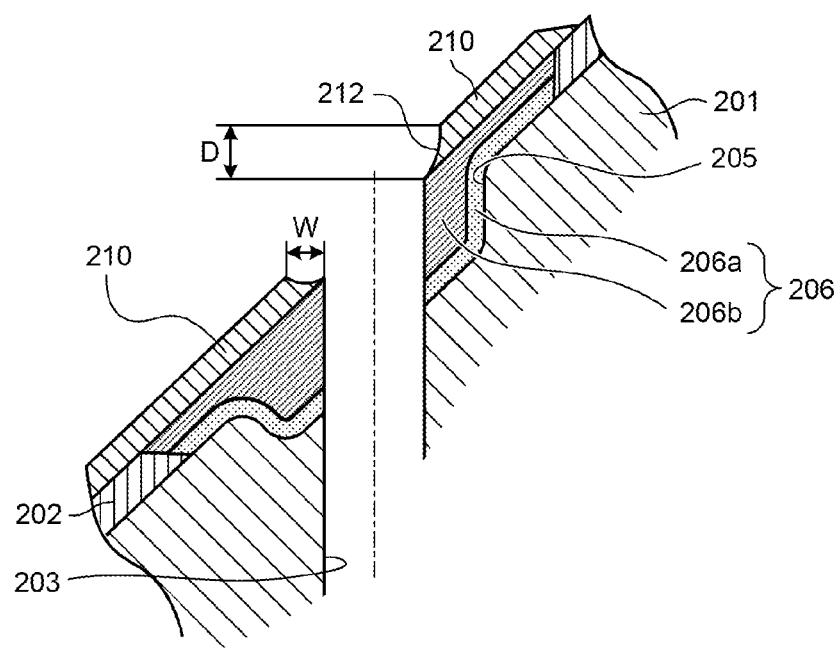
Figures 1, 19:
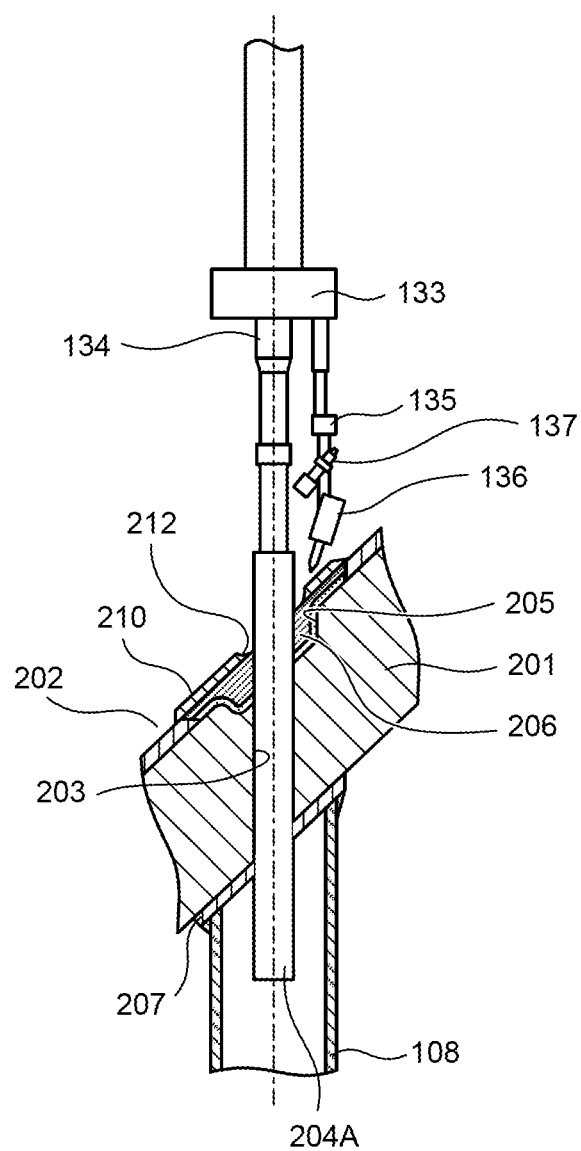
Figures 2, 19:
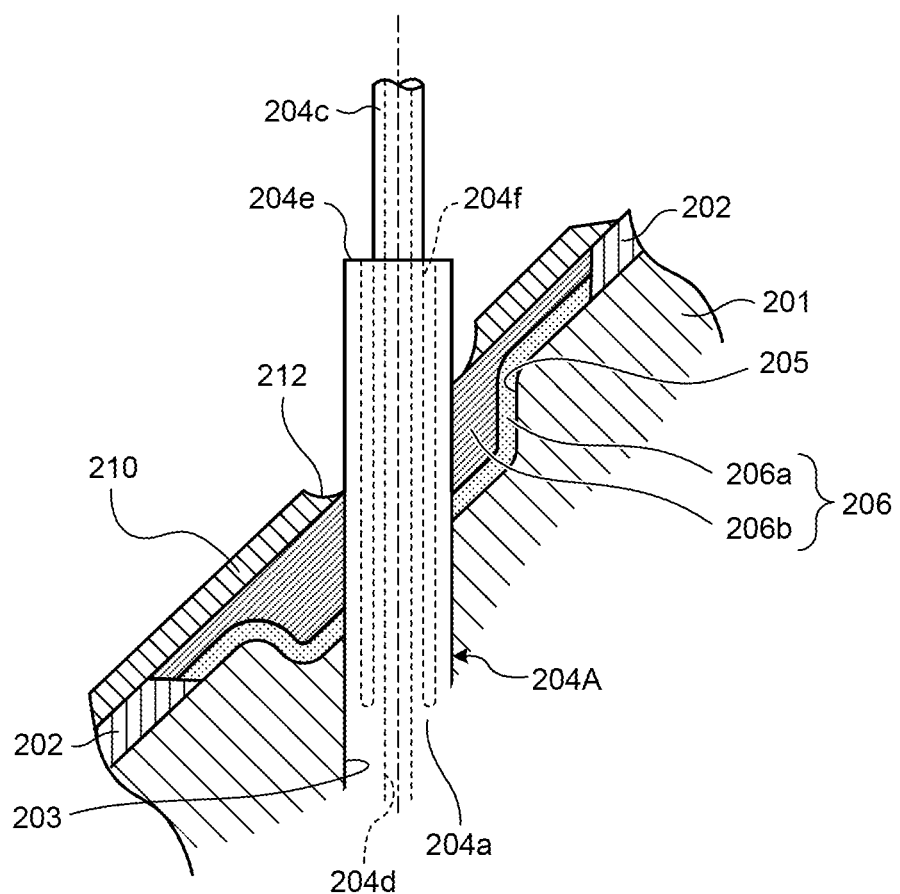
Figures 1, 20:
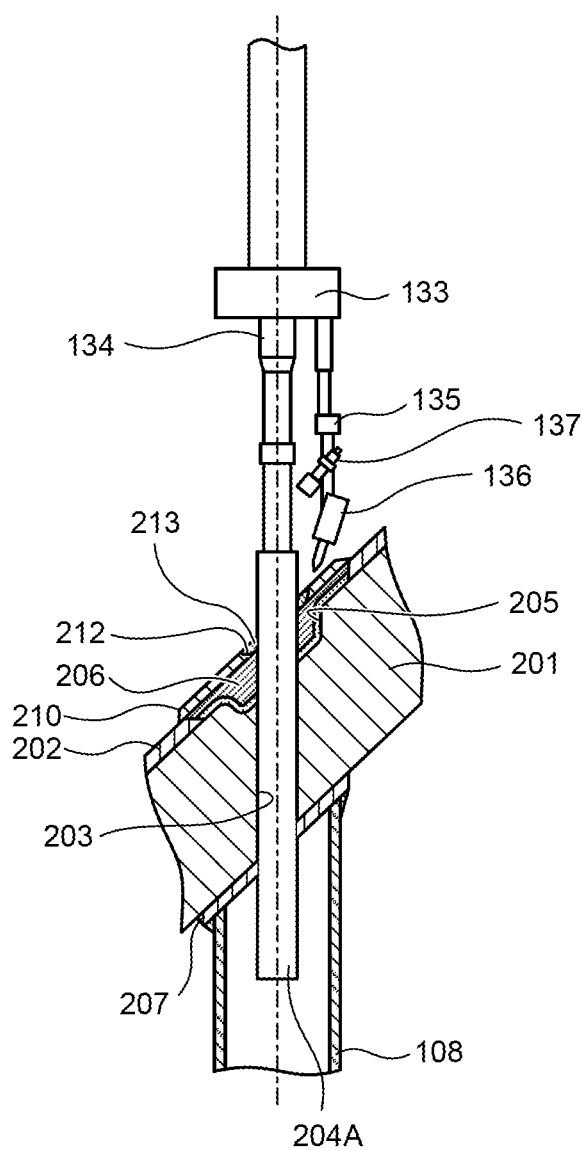
Figures 2, 20:
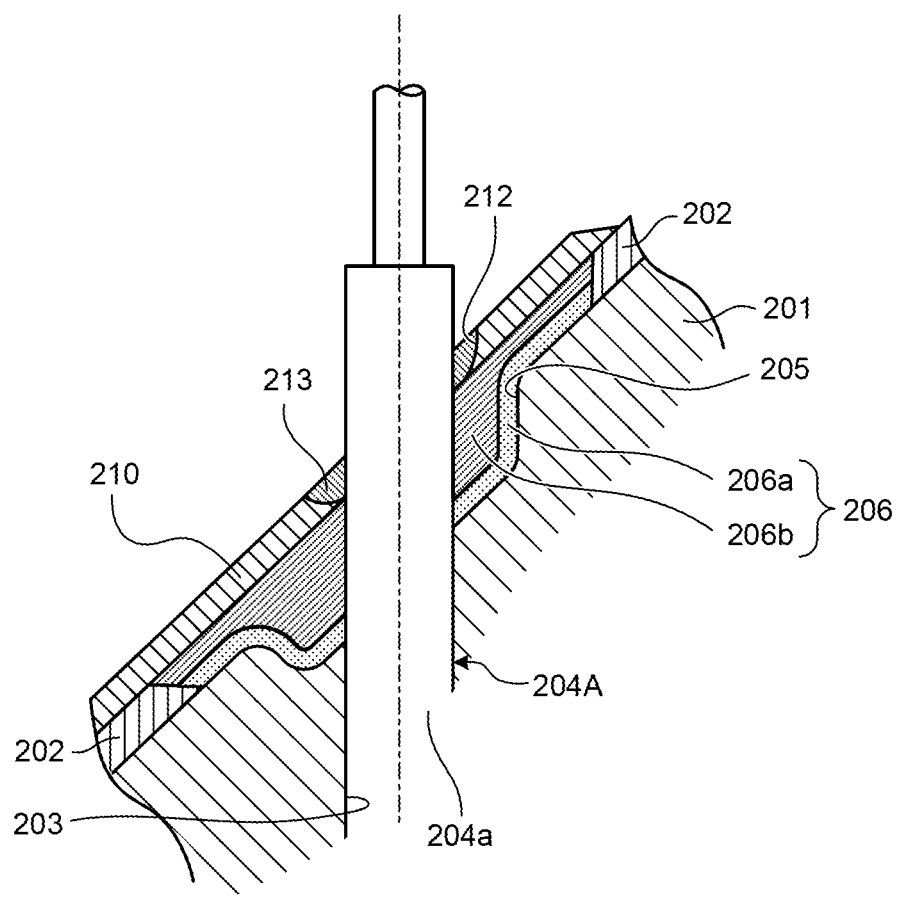
Figure 21:
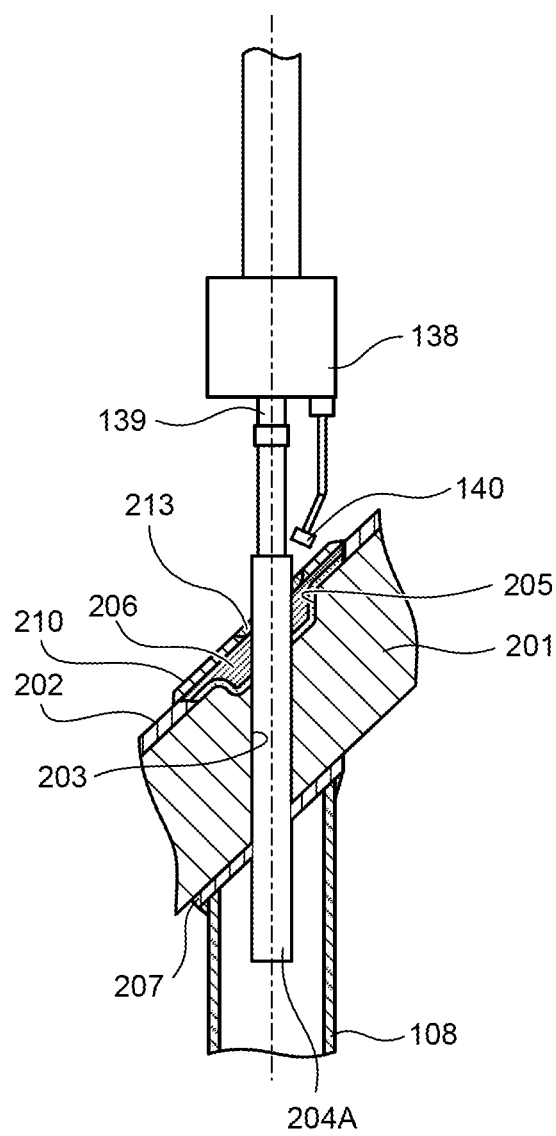
FIG. 21 is a schematic diagram illustrating an inspection operation for a welding portion of the in-core instrumentation cylinder in the instrumentation nozzle.

FIG. 1 is a cross-sectional view illustrating an instrumentation nozzle of a nuclear reactor vessel that is repaired by a nozzle repair method according to an embodiment of the invention, FIG. 4 is a flowchart illustrating the nozzle repair method of the embodiment, FIG. 5-1 is a schematic diagram of the nuclear reactor vessel illustrating a water stopping operation for an in-core instrumentation cylinder in the instrumentation nozzle, FIG. 5-2 is a schematic diagram illustrating the water stopping operation for the in-core instrumentation cylinder, FIG. 6 is a schematic diagram illustrating a conduit tube cutting operation, FIG. 7 is a schematic diagram illustrating a water stopping cap attachment operation, FIG. 8 is a schematic diagram illustrating an operation of mounting a guide device and a support trestle to the nuclear reactor vessel, FIG. 9 is a schematic diagram illustrating a water removing operation in the nuclear reactor vessel, FIG. 10 is a schematic diagram illustrating a cutting operation for the in-core instrumentation cylinder, FIG. 11-1 is a schematic diagram illustrating a trepanning operation for the in-core instrumentation cylinder, FIG. 11-2 is a cross-sectional view illustrating the trepanned in-core instrumentation cylinder, FIG. 12 is a cross-sectional view illustrating a drawing operation in the in-core instrumentation cylinder, FIG. 13-1 is a schematic diagram illustrating a thickness measurement operation for a stainless steel overlaid portion in the instrumentation nozzle, FIG. 13-2 is a main enlarged diagram illustrating a thickness measurement operation for the stainless steel overlaid portion in the instrumentation nozzle, FIG. 14-1 is a schematic diagram illustrating a welding portion area measurement operation in the instrumentation nozzle, FIG. 14-2 is a main enlarged diagram illustrating the welding portion area measurement operation in the instrumentation nozzle, FIG. 15-1 is a schematic diagram illustrating a buttered-welding operation in the instrumentation nozzle, FIG. 15-2 is a cross-sectional view illustrating the instrumentation nozzle subjected to a buttered-welding operation, FIG. 16 is a cross-sectional view illustrating a buttered-welding portion subjected to a shaping operation in the instrumentation nozzle, FIG. 17 is a schematic diagram illustrating a measurement operation for a welding portion in the instrumentation nozzle, FIG. 18-1 is a schematic diagram illustrating a grooving operation for the welding portion in the instrumentation nozzle, FIG. 18-2 is a cross-sectional view illustrating a welding portion subjected to a grooving operation in the instrumentation nozzle, FIG. 19-1 is a schematic diagram illustrating an operation of inserting an in-core instrumentation cylinder into the instrumentation nozzle, FIG. 19-2 is a cross-sectional view illustrating the in-core instrumentation cylinder inserted into the instrumentation nozzle, FIG. 20-1 is a schematic diagram illustrating a welding operation and an inspection operation for the in-core instrumentation cylinder in the instrumentation nozzle, FIG. 20-2 is a cross-sectional view illustrating the in-core instrumentation cylinder welded to the instrumentation nozzle, and FIG. 21 is a schematic diagram illustrating an inspection operation for a welding portion of the in-core instrumentation cylinder in the instrumentation nozzle.

Hereinafter, a nozzle repair method of the embodiment will be described in detail with reference to the cross-sectional view of FIG. 1, the flowchart of FIG. 4, and the schematic diagrams from FIGS. 5-1 to 21.

As illustrated in FIGS. 4 and 5-1, in step S11, the nuclear reactor vessel head 63 is separated from the nuclear reactor vessel body 62 constituting the nuclear reactor vessel 61 in the pressurized water reactor 12, and an in-core structure (an upper in-core structure 12A and a lower in-core structure 12B) provided therein is removed. In this case, a nuclear reactor building 101 is provided with a cavity 102 capable of storing the cooling water, and an appliance temporary placement pool 104 is provided near a nuclear reactor pool 103 where the pressurized water reactor 12 is suspended. For that reason, the upper in-core structure 12A and the lower in-core structure 12B are temporarily placed while being immersed into the cooling water of the appliance temporary placement pool 104.

As illustrated in FIG. 5-2, in the nuclear reactor vessel body 62, an inner surface of a base material 201 formed of low-alloy steel is provided with a buttered-welding layer 202 formed of stainless steel. Then, the instrumentation nozzle 83 has a configuration in which an in-core instrumentation cylinder 204 formed of a nickel base alloy (for example, Inconel 600/trademark) is inserted and positioned into an attachment hole 203 formed in the lower end plate 66 of the nuclear reactor vessel body 62 in the vertical direction and a groove-welding portion 206 (a lower welding portion 206a and a main welding portion 206b) formed of a nickel base alloy (for example, Inconel 600) is provided in a grooving portion 205 formed in the inner surface of the lower end plate 66.

As illustrated in FIGS. 4, 5-1, and 5-2, in step S12, a water stopping plug handling device 105 is provided above the cavity 102 and a water stopping plug attachment device 106 gripping a water stopping plug 107 moves downward inside the cooling water of the cavity 102. Then, the water stopping plug 107 is fitted to the upper end of the in-core instrumentation cylinder 204 constituting the instrumentation nozzle 83 of the nuclear reactor vessel body 62 so as to plug the upper end. Further, as illustrated in FIGS. 4 and 6, in step S13, the conduit tube 85 connected to the lower end of the in-core instrumentation cylinder 204 is cut. Then, as illustrated in FIGS. 4 and 7, in step S14, a water stopping cap 108 is fixed to the lower portion of the instrumentation nozzle 83.

In this case, the water stopping cap 108 includes a casing 108a of which an upper end is opened and a lower end is closed, a pipe 108b which is connected to the lower portion of the casing 108a, and an opening/closing valve 108c which is provided in the pipe 108b. Meanwhile, the outer surface of the lower end plate 66 is provided with a buttered-welding layer 207 formed of stainless steel in advance. For that reason, the water stopping cap 108 has a configuration in which the upper end of the casing 108a is welded and fixed to the buttered-welding layer 207 of the lower end plate 66 so as to cover the lower portion of the in-core instrumentation cylinder 204.

When the water is stopped at the upper and lower ends of the existing in-core instrumentation cylinder 204 of the instrumentation nozzle 83, an aerial space for performing a water removing process in the nuclear reactor vessel body 62 is formed. That is, as illustrated in FIGS. 4 and 8, in step S15, a support trestle 110 equipped with a guide device 109 moves downward inside the cooling water from the upside of the cavity 102, and the guide device 109 is adjusted to a predetermined height position. Then, as illustrated in FIGS. 4 and 9, in step S16, when the guide device 109 is provided inside the nuclear reactor vessel body 62, the water is stopped at the upper end of the nuclear reactor vessel body 62 by a seal plate 111, and a guide pipe 112 is connected to the seal plate. In this state, a drying facility (not illustrated) is provided above the cavity 102, and the cooling water inside the nuclear reactor vessel body 62 is discharged through the guide pipe 112 by using a submersible pump, so that an aerial space (the diagonal line part of FIG. 9) is formed in the reactor. In this case, the water is also stopped at the inlet nozzle 67 and the outlet nozzle 68 of the nuclear reactor vessel body 62. Then, when an aerial space is formed inside the nuclear reactor vessel body 62, the water stopping plug 107 is separated from the upper end of the in-core instrumentation cylinder 204 of the instrumentation nozzle 83.

Furthermore, here, a configuration is employed in which the water is stopped at the upper end of the nuclear reactor vessel body 62 by the seal plate 111 and the entire water therein is discharged. However, a configuration may be employed in which the instrumentation nozzle 83 is surrounded by a casing (not illustrated) and the cooling water inside the casing is discharged so as to form an aerial space.

When an aerial space is formed inside the nuclear reactor vessel body 62, various operations are performed inside the nuclear reactor vessel body 62. However, various devices are carried into the nuclear reactor vessel body 62 through the guide pipe 112, and are used while being supported by the guide device 109.

As illustrated in FIGS. 4 and 10, in step S17, the upper portion of the in-core instrumentation cylinder 204 in the instrumentation nozzle 83 is cut (machined) by a cutting device (not illustrated) and the upper portion of the cut in-core instrumentation cylinder 204 is collected. As illustrated in FIGS. 4 and 11-1, in step S18, the groove-welding portion 206 of the in-core instrumentation cylinder 204 fixed to the lower end plate 66 is trepanned (as a trepanning portion 208) by using a cutting device (not illustrated), and as illustrated in FIG. 11-2, an opening gap 209 is formed between the in-core instrumentation cylinder 204 and the groove-welding portion 206. That is, the trepanning portion 208 as the connection portion with respect to the in-core instrumentation cylinder 204 in the groove-welding portion 206 is removed. At this time, the trepanning process is performed from the upper end of the groove-welding portion 206, that is, the inner surface of the lower end plate 66 to the downside of the groove-welding portion 206, that is, the base material 201 of the lower end plate 66. Furthermore, even when the groove-welding portion 206 of the in-core instrumentation cylinder 204 is trepanned by a cutting device, produced chips are collected by a suction device (not illustrated).

As illustrated in FIGS. 4 and 12, in step S19, the in-core instrumentation cylinder 204 is extracted and collected upward from the attachment hole 203 of the lower end plate 66 by using an extraction device (not illustrated). As illustrated in FIG. 4, in step S20, the groove-welding portion 206 is inspected. First, as illustrated in FIGS. 13-1 and 13-2, the thickness of the buttered-welding layer 202 is measured in a manner such that a thickness measurement device (an ultrasonic inspection device) 122 attached to a processing head 121 moves along the surface of the buttered-welding layer 202 in the periphery of the groove-welding portion 206, and hence it is checked whether the thickness of the buttered-welding layer 202 is equal to or larger than a predetermined thickness. Next, as illustrated in FIGS. 14-1 and 14-2, the range of the groove-welding portion 206 is measured in a manner such that an area measurement device (an eddy current inspection device) 124 attached to a processing head 123 moves along the surface of the groove-welding portion 206, and hence it is checked whether the range of the groove-welding portion 206 is equal to or larger than a predetermined range.

As illustrated in FIGS. 4 and 15-1, in step S21, the surface of the groove-welding portion 206 is buttered-welded by the buttered-welding device 125. That is, as illustrated in FIGS. 15-1 and 15-2, first, a tab plate 127 having a plug shape is positioned to the inside of the groove-welding portion 206, that is, the upper end of the attachment hole 203 by using a support rod 126. Next, a welding head 128 moves along the surface of the groove-welding portion 206 so as to form a surface buttered-welding portion 210 by buttered-welding the surface of the groove-welding portion 206. Furthermore, the tab plate 127 is not limited to a plug shape, but may be formed in a donut shape or the like. At this time, when the welding head 128 moves to the inner surface (the surface) of the lower end plate 66 (the buttered-welding layer 202) and the surface of the tab plate 127 beyond the surface of the groove-welding portion 206 while monitoring the processing state using a camera 129, the surface buttered-welding portion 210 extends to the lower end plate 66 and extends to the attachment hole 203.

In this case, two layers or more of buttered-welding are performed on the surface of the groove-welding portion 206 so as to form the surface buttered-welding portion 210 thicker than at least the thickness of the groove-welding portion 206. Subsequently, the thickness of the surface buttered-welding portion 210 is measured in a manner such that a thickness measurement device (a penetration flaw inspection device), which is not illustrated, moves along the surface of the surface buttered-welding portion 210, and hence it is checked whether the thickness of the surface buttered-welding portion 210 is equal to or larger than a predetermined thickness. Then, as illustrated in FIG. 16, the tab plate 127 is removed by a cutting device 141. Further, the surface buttered-welding portion 210 extending to the attachment hole 203 is removed and shaped by the cutting device 141, and the inner surface of the attachment hole 203 is machined so as to shape the inner surface. Then, as illustrated in FIG. 17, the thickness (the depth) of the groove-welding portion 206 of the attachment hole 203 is measured by using an overlaid thickness measurement device (an eddy current inspection device) 130, and hence it is checked whether the thickness of the groove-welding portion 206 is equal to or larger than a predetermined thickness.

As illustrated in FIGS. 4 and 18-1, in step S22, the groove-welding portion 206 (the main welding portion 206b) is grooved by a grooving device 132 attached to the processing head 131. That is, as illustrated in FIGS. 18-1 and 18-2, a welding groove 212 having a predetermined width W in the surface direction of the lower end plate 66 and a predetermined depth D in the thickness direction of the lower end plate 66 is formed by grooving the upper end near the attachment hole 203 in the inner surface of the lower end plate 66 and the surface buttered-welding portion 210 provided in the periphery of the attachment hole 203. In this case, the periphery of the attachment hole 203 has a curved shape, but the welding groove 212 has the same shape in the entire periphery. Further, the welding groove 212 is provided in the surface buttered-welding portion 210, and remains while not being grooved to the existing groove-welding portion 206. At this time, the welding groove 212 is inspected in a manner such that a penetration flaw inspection device (not illustrated) moves along the surface of the welding groove 212.

As illustrated in FIGS. 4 and 19-1, in step S23, a new in-core instrumentation cylinder 204A formed of a nickel base alloy (for example, Inconel 690) is prepared, the upper end of the new in-core instrumentation cylinder 204A is restrained by a restraining device 134 provided in a processing head 133, and the in-core instrumentation cylinder 204A is inserted from the upside into the attachment hole 203 of the lower end plate 66.

In this case, the new in-core instrumentation cylinder 204A includes, as illustrated in FIG. 1, a main body portion 204a which is inserted into the attachment hole 203 of the lower end plate 66, a lower body 204b which is continuous to the lower end of the main body portion 204a and has an outer diameter slightly smaller than the outer diameter of the main body portion 204a, a support portion 204c which is continuous to the upper end of the main body portion 204a and has an outer diameter smaller than the outer diameter of the main body portion 204a, an instrumentation equipment guide passage 204d which penetrates the main body portion 204a and the support portion 204c, and a groove portion 204f of which an end is opened to a stepped portion 204e between the main body portion 204a and the support portion 204c. The outer diameter R of the main body portion 204a is set to correspond to the inner diameter of the shaped attachment hole 203. Further, the groove portion 204f is continuous in the circumferential direction, and has a predetermined depth. For that reason, in the new in-core instrumentation cylinder 204A, an outer peripheral wall portion 204g located at the outside of the groove portion 204f has a thickness T smaller than the thickness of the main body portion 204a due to the groove portion 204f. Accordingly, when the in-core instrumentation cylinder 204A is inserted into the attachment hole 203 of the lower end plate 66, the outer peripheral wall portion 204g is disposed inside at least the surface buttered-welding portion 210.

When the new in-core instrumentation cylinder 204A is fixed by welding, as illustrated in FIGS. 19-1 and 19-2, the new in-core instrumentation cylinder 204A is positioned to the lower end plate 66 so that the outer peripheral wall portion 204g is disposed inside the surface buttered-welding portion 210. Subsequently, the in-core instrumentation cylinder 204A is temporarily welded by a welding head 136 of the welding device 135 provided in the processing head 133.

As illustrated in FIGS. 4 and 20-1, in step S24, the new in-core instrumentation cylinder 204A which is temporarily welded to the attachment hole 203 of the lower end plate 66 is fixed by groove-welding. That is, as illustrated in FIGS. 20-1 and 20-2, a new groove welding portion 213 is formed and fixed by groove-welding the outer peripheral portion of the in-core instrumentation cylinder 204A in a manner such that the welding head 136 of the welding device 135 moves along the welding groove 212 while monitoring the welding groove 212 using the camera 137.

In this case, it is desirable that the material of the new in-core instrumentation cylinder 204A fixed to the lower end plate 66, the welding material of the surface buttered-welding portion 210, and the welding material used to fix the in-core instrumentation cylinder 204A be prepared as a nickel base alloy (for example, Inconel 690) as a welding material having higher stress corrosion cracking resistance than the nickel base alloy (for example, Inconel 600) as the welding material of the existing in-core instrumentation cylinder 204 or the groove-welding portion 206. However, the material of the new in-core instrumentation cylinder 204A and the welding material of the new groove welding portion 213 may be the same as that of the existing in-core instrumentation cylinder 204 or the groove-welding portion 206. For example, both may be stainless steel. Further, it is desirable that the welding material of the surface buttered-welding portion 210 be also the nickel base alloy (for example, Inconel 690) as the welding material having high stress corrosion cracking resistance. However, the same material may be used or stainless steel may be used.

As illustrated in FIGS. 4 and 21, in step S25, the new groove welding portion 213 is inspected. That is, it is checked whether the inclination degree (the erection angle) of the in-core instrumentation cylinder 204A is within a predetermined range by an inclinometer (not illustrated) while the in-core instrumentation cylinder 204A is supported by a support portion 139 of a processing head 138. Further, it is checked whether a crack occurs by inspecting the new groove welding portion 213 in a manner such that the penetration flaw inspection device 140 moves along the surface of the new groove welding portion 213. Then, as illustrated in FIG. 4, in step S26, the cooling water is supplied into the nuclear reactor vessel body 62 after the conduit tube 85 is connected to the repaired instrumentation nozzle 83. Then, the in-core structure (the upper in-core structure 12A and the lower in-core structure 12B) is returned into the nuclear reactor vessel body 62 after various devices such as the seal plate 111 are removed, and then the nuclear reactor vessel head 63 is attached to restore the in-core structure.

As illustrated in FIG. 1, in the repaired instrumentation nozzle 83, the existing groove-welding portion 206 having a semi-spherical shape at the inner surface side is provided in the attachment hole 203 of the nuclear reactor vessel body 62 having the buttered-welding layer 202 formed of stainless steel as the inner surface of the base material 201 formed of low-alloy steel, the surface buttered-welding portion 210 is provided in the surface of the groove-welding portion 206, the in-core instrumentation cylinder 204A formed of a nickel base alloy is inserted and positioned to the attachment hole 203, the new groove welding portion 213 formed of a nickel base alloy and having higher stress corrosion cracking resistance than the groove-welding portion 206 is provided in the welding groove 212 formed in the surface buttered-welding portion 210, and the in-core instrumentation cylinder 204A is fixed by the new groove welding portion 213.

In this way, the nozzle repair method of the embodiment includes removing the connection portion (the trepanning portion) 208 with respect to the in-core instrumentation cylinder 204 in the groove-welding portion 206, removing the in-core instrumentation cylinder 204 from the lower end plate (the semi-spherical portion) 66, forming the surface buttered-welding portion 210 by buttered-welding the surface of the groove-welding portion 206, forming the welding groove 212 by grooving the surface buttered-welding portion 210, inserting the new in-core instrumentation cylinder 204A provided with the circumferential groove portion 204f outside the instrumentation equipment guide passage 204d into the attachment hole 203, and fixing the new in-core instrumentation cylinder 204A by groove-welding the welding groove 212.

Accordingly, the welding groove 212 is formed by buttered-welding the surface of the groove-welding portion 206 in which the in-core instrumentation cylinder 204 is removed, the new in-core instrumentation cylinder 204A provided with the groove portion 204f is inserted into the attachment hole 203, and the in-core instrumentation cylinder 204A is fixed by groove-welding the welding groove 212. Since the new in-core instrumentation cylinder 204A is provided with the circumferential groove portion 204f, the thickness T of the outer peripheral wall portion 204g outside the groove portion 204f is smaller than the thickness of the main body portion 204a.

In a technical standards for nuclear power generation equipment, the depth or the width of the welding joint is set to 0.75 times or more the plate thickness of the pipe. For that reason, the depth or the width of the new groove welding portion 213 (the welding groove 212) may be decreased in accordance with a decrease in the thickness T of the outer peripheral wall portion 204g of the in-core instrumentation cylinder 204A. In the nuclear reactor vessel body 62, the inner surface of the base material 201 formed of low-alloy steel is provided with the buttered-welding layer 202 formed of stainless steel. Since the buttered-welding layer 202 does not constitute the reinforced member of the nuclear reactor vessel body 62, the new groove welding portion 213 needs to be set within a range not reaching the buttered-welding layer 202. In the embodiment, since the new groove welding portion 213 exists within the area A of the existing groove-welding portion 206 while the width W and the depth D are set to be small, the repair may be easily performed, and the workability may be improved.

In the nozzle repair method of the embodiment, when the surface buttered-welding portion 210 is formed on the surface of the groove-welding portion 206, buttered-welding is performed to the inner surface of the lower end plate 66, and buttered-welding is performed to the attachment hole 203. Accordingly, since the surface of the existing groove-welding portion 206 is coated by the new surface buttered-welding portion 210 without any gap, the stress corrosion cracking resistance may be improved.

In the nozzle repair method of the embodiment, the inner surface of the attachment hole 203 is machined after the surface buttered-welding portion 210 is formed on the surface of the groove-welding portion 206. Accordingly, since the new in-core instrumentation cylinder 204A is inserted into the attachment hole 203 after the inner surface of the attachment hole 203 is machined, the attachment precision may be improved.

In the nozzle repair method of the embodiment, the welding groove 212 is formed within the area of the groove-welding portion 206. Accordingly, since the new in-core instrumentation cylinder 204A may be appropriately fixed to the attachment hole 203, the durability of the instrumentation nozzle 83 may be improved.

In the nozzle repair method of the embodiment, the new in-core instrumentation cylinder 204A includes the main body portion 204a which is inserted into the attachment hole 203, the small-diameter support portion 204c which is continuous to the upper end of the main body portion 204a, the instrumentation equipment guide passage 204d which penetrates the main body portion 204a and the support portion 204c, and the circumferential groove portion 204f of which the end is opened to the stepped portion 204e between the main body portion 204a and the support portion 204c. Accordingly, in the new in-core instrumentation cylinder 204a, since the groove portion 204f is opened to the stepped portion 204e, the groove portion 204f may be easily formed. Also, it is possible to simplify the in-core instrumentation cylinder 204A and to suppress the depth or the width of each of the welding groove 212 and the new groove welding portion 213 for the welding groove 212 in the in-core instrumentation cylinder 204A within a predetermined range.

In the nozzle repair method of the embodiment, the welding material (the surface buttered-welding portion 210 and the new groove welding portion 213) used to fix the new in-core instrumentation cylinder 204A to the lower end plate 66 is prepared as a material having higher stress corrosion cracking resistance than the welding material of the groove-welding portion 206. Accordingly, it is possible to improve the stress corrosion cracking resistance compared to the existing instrumentation nozzle 83.

Further, in the nuclear reactor vessel of the embodiment, the surface buttered-welding portion 210 is provided on the surface of the buttered-welding layer 202 in the attachment hole 203 of the nuclear reactor vessel body 62 having the buttered-welding layer 202 formed of stainless steel and formed on the inner surface of the base material 201 formed of low-alloy steel after the repair of the instrumentation nozzle 83, the welding groove 212 is formed on the surface buttered-welding portion 210, the in-core instrumentation cylinder 204A formed of a nickel base alloy is inserted and positioned to the attachment hole 203, the new groove welding portion 213 formed of a nickel base alloy and having higher stress corrosion cracking resistance than the groove-welding portion 206 is provided in the welding groove 212, and the in-core instrumentation cylinder 204A is fixed by the new groove welding portion 213.

Accordingly, since the new in-core instrumentation cylinder 204A is fixed to the lower end plate 66 of the nuclear reactor vessel body 62 by the new groove welding portion 213 having high stress corrosion cracking resistance, the stress corrosion cracking resistance of the instrumentation nozzle 83 may be improved.

In the nuclear reactor vessel of the embodiment, the circumferential groove portion 204f is formed by the opening of the end to the stepped portion 204e with respect to the main body portion 204a in the in-core instrumentation cylinder 204A. Accordingly, since the thickness of the outer peripheral wall portion 204g of the in-core instrumentation cylinder 204A is decreased by the groove portion 204f, the depth or the width of the new groove welding portion 213 (the welding groove 212) may be decreased. Accordingly, the workability of the repair of the instrumentation nozzle 83 may be improved, and the structure of the repaired instrumentation nozzle 83 may be simplified.

Furthermore, in the above-described embodiment, the groove portion 204f which is formed in the in-core instrumentation cylinder 204A has a configuration in which the radial width is uniform in the depth direction, but the width may be tapered in the depth direction. However, the thickness of the outer peripheral wall portion 204g needs to be uniform.

Further, in the above-described embodiment, a method of repairing the instrumentation nozzle 83 provided in the lower end plate 66 of the nuclear reactor vessel body 62 has been described, but the method may be also used to repair the instrumentation nozzle provided in the upper end plate of the nuclear reactor vessel head 63. Further, a case has been described in which the nozzle repair method of the invention is applied to the pressurized water reactor, but the nozzle repair method may be also applied to a boiling-water nuclear reactor.

REFERENCE SIGNS LIST

61 NUCLEAR REACTOR VESSEL
62 NUCLEAR REACTOR VESSEL BODY
63 NUCLEAR REACTOR VESSEL HEAD
66 LOWER END PLATE (SEMI-SPHERICAL PORTION)
83 INSTRUMENTATION NOZZLE
84 IN-CORE INSTRUMENTATION GUIDE PIPE
85 CONDUIT TUBE
88 THIMBLE PIPE
201 BASE MATERIAL
202 BUTTERED-WELDING LAYER
203 ATTACHMENT HOLE
204 IN-CORE INSTRUMENTATION CYLINDER
204A IN-CORE INSTRUMENTATION CYLINDER
204a MAIN BODY PORTION
204c SUPPORT PORTION
204d INSTRUMENTATION EQUIPMENT GUIDE PASSAGE
204f GROOVE PORTION
204g OUTER PERIPHERAL WALL PORTION
205 GROOVING PORTION
206 GROOVE-WELDING PORTION
208 TREPANNING PORTION (CONNECTION PORTION)
210 SURFACE BUTTERED-WELDING PORTION
212 WELDING GROOVE
213 NEW GROOVE WELDING PORTION

The invention claimed is:

1. A nozzle repair method for a nuclear reactor instrumentation nozzle comprising an in-core instrumentation cylinder inserted into an attachment hole in a semi-spherical portion of a nuclear reactor vessel and a groove-weld between an inner surface of the semi-spherical portion and an outer surface of the in-core instrumentation cylinder, the method comprising steps of:
   disconnecting the in-core instrumentation cylinder from the nuclear reactor vessel by severing the groove-weld therebetween;
   removing the in-core instrumentation cylinder from the semi-spherical portion;
   forming a surface buttered-welding portion by buttered-welding a surface of the groove-weld;
   forming a welding groove by grooving the surface buttered-welding portion;
   inserting a new in-core instrumentation cylinder provided with an instrumentation equipment guide passage and a groove portion into the attachment hole, the instrumentation equipment guide passage penetrating the new in-core instrumentation cylinder in an axial direction thereof, the groove portion being provided radially outside of and along a circumference of the instrumentation equipment guide passage, one end of the groove portion being opened in the axial direction; and
   fixing the new in-core instrumentation cylinder by groove-welding the welding groove to an outer circumference of the new in-core instrumentation cylinder.

2. The nozzle repair method according to claim 1, wherein the step of forming the surface buttered-welding portion includes performing buttered-welding on an area extending from the surface of the groove-weld to the inner surface of the semi-spherical portion and to the attachment hole.

3. The nozzle repair method according to claim 1,
   wherein after the step of forming the surface buttered-welding portion on the surface of the groove-weld, an inner surface of the attachment hole is machined.

4. The nozzle repair method according to claim 1,
   wherein the welding groove is formed within an area of the groove-weld.

5. The nozzle repair method according to claim 1,
   wherein the new in-core instrumentation cylinder includes
      a main body portion which is inserted into the attachment hole and in contact with an inner surface thereof, a support portion which is continuous to the upper end of the main body portion and has a diameter smaller than the main body portion, the instrumentation equipment guide passage which penetrates the main body portion and the support portion, and the groove portion of which the end is opened to a stepped portion between the main body portion and the support portion.

6. The nozzle repair method according to claim 1, wherein a welding material used to fix the new in-core instrumentation cylinder to the semi-spherical portion is a material having higher stress corrosion cracking resistance than the welding material of the groove-weld.

* * * * *